(12) United States Patent
Fieldman

(10) Patent No.: US 8,615,784 B2
(45) Date of Patent: Dec. 24, 2013

(54) GROUP INTERACTIVE NETWORK (GIN) SYSTEM

(76) Inventor: Ethan Fieldman, Gainesville, FL (US)

( * ) Notice: Subject to any disclaimer, the term of this patent is extended or adjusted under 35 U.S.C. 154(b) by 1489 days.

(21) Appl. No.: 11/831,936

(22) Filed: Jul. 31, 2007

(65) Prior Publication Data

US 2008/0040442 A1   Feb. 14, 2008

Related U.S. Application Data

(60) Provisional application No. 60/834,388, filed on Jul. 31, 2006.

(51) Int. Cl.
*G06F 21/00*   (2013.01)

(52) U.S. Cl.
USPC .......... 726/1; 726/27; 726/30; 713/189; 709/207; 709/224; 455/411; 705/35; 705/37

(58) Field of Classification Search
USPC .......................................... 726/4, 1; 709/204
See application file for complete search history.

(56) References Cited

U.S. PATENT DOCUMENTS

| | | | |
|---|---|---|---|
| 2002/0138582 A1* | 9/2002 | Chandra et al. | 709/206 |
| 2002/0147923 A1* | 10/2002 | Dotan | 713/200 |
| 2002/0169774 A1* | 11/2002 | Greenbaum et al. | 707/9 |
| 2003/0050986 A1* | 3/2003 | Matthews et al. | 709/206 |
| 2003/0061087 A1* | 3/2003 | Srimuang | 705/8 |
| 2003/0088824 A1* | 5/2003 | Ayan | 715/500 |
| 2003/0191762 A1* | 10/2003 | Kalliokulju et al. | 707/100 |
| 2003/0191806 A1* | 10/2003 | Osterberg et al. | 709/206 |
| 2004/0064733 A1* | 4/2004 | Gong | 713/201 |
| 2004/0243672 A1* | 12/2004 | Markki et al. | 709/204 |
| 2005/0091595 A1* | 4/2005 | Shappell et al. | 715/700 |
| 2005/0198125 A1* | 9/2005 | Macleod Beck et al. | 709/204 |
| 2006/0005036 A1* | 1/2006 | Hu et al. | 713/182 |
| 2006/0031510 A1* | 2/2006 | Beck et al. | 709/226 |
| 2007/0073572 A1* | 3/2007 | McLaughlin et al. | 705/9 |
| 2007/0143685 A1* | 6/2007 | Stillion et al. | 715/733 |
| 2007/0168446 A1* | 7/2007 | Keohane et al. | 709/207 |
| 2007/0220090 A1* | 9/2007 | Hall | 709/204 |

* cited by examiner

*Primary Examiner* — Morshed Mehedi
(74) *Attorney, Agent, or Firm* — Saliwanchik, Lloyd & Eisenschenk

(57) ABSTRACT

Embodiments of the subject invention provide methods of using an integrated database management system and communication tool to provide group management and communication services through wide area networks (WAN). Embodiments of the invention can utilize computer-implemented methods and systems for uniquely organizing, integrating, and assembling the different information sharing and communication features via a user-friendly interface allowing access from a plurality of independent computer workstations after user identification. Further embodiments, of the invention can include a database server for managing members' information and data. Still further embodiments, of the invention can incorporate a graphical user interface server for interacting with users in an organization.

21 Claims, 27 Drawing Sheets

| | | | | | |
|---|---|---|---|---|---|
| Event Title | | | | | |
| Event Description | | | | | |
| Event Type | ○ | One time | ○ | Recurring | |
| Start date | | | End date | | |
| Event Date | Month | | Day | | Year |

Event ☐ Color 1
☐ Color 2
☐ Color 3
☐ Color 4

If Calendar is in public mode

Event Meant for access levels ☐ Admininstrators
☐ Officers
☐ Members
☐ Alumni

☐ Immediately notify members
☐ Send reminder email _____ days and _____ hours before the event
☐ Send reminder text message _____ days and _____ hours before the event

FIG. 19

Description [        ]

Members who will see this message
- ☐ Admins
- ☐ Officers
- ☐ Members
- ☐ Alumni
- ☐ Junior members Express in [    ] days Choose Group Portals to show this message on

- ☐ Group Portal 1
- ☐ Group Portal 2
- ☐ ⋮

FIG. 20

Customize Greeting/Message on Login screen

| Message text editor control |
|---|
| WELCOME TO ZETA ALPHA PI |

[ Save the greeting ]

[ Force all users to change passwords ]

Help Person/Email
Help person first name  [          ]
Last name  [          ]
Email address  [          ]

Session timeout  [       ] minutes  [       ] seconds

Welcome screen slide show pictures
Slide time delay  [            ] seconds
Slide # 1 image file  [            ]  [BROWSE]  [EXISTING PICTURE]  [DELETE PICTURE]
Slide # 2 image file  [            ]  [BROWSE]  [EXISTING PICTURE]  [DELETE PICTURE]
•
•
•

Login screen pictures
Picture # 1 image file  [            ]  [BROWSE]  [EXISTING PICTURE]  [DELETE PICTURE]
Picture # 2 image file  [            ]  [BROWSE]  [EXISTING PICTURE]  [DELETE PICTURE]
Picture # 3 image file  [            ]  [BROWSE]  [EXISTING PICTURE]  [DELETE PICTURE]

FIG. 24

GROUP INTERACTIVE NETWORK (GIN) SYSTEM

CROSS-REFERENCE TO RELATED APPLICATION

The present application claims the benefit of U.S. Provisional Application Ser. No. 60/834,388, filed Jul. 31, 2006, which is hereby incorporated by reference herein in its entirety, including any figures, tables, or drawings.

FIELD OF THE INVENTION

The present invention relates generally to group network communications. More specifically, to an integrated database management system and communication tool that provides group management and communication services through wide area networks.

BACKGROUND OF THE INVENTION

Communication, association, and affiliation are primary social needs of any normal individual. As individuals come together and form social, professional, cultural, ethnic, recreational or other group associations, the need for efficient yet low-cost communication tools increases. Many organizations have a variety of tools at their disposal to communicate and collaborate. A major issue is how to leverage these tools to maximize their benefits and, ultimately, the ability of the organization to communicate effectively.

Many organizations designate access to communication tools based upon different access levels of individuals, often based on the group dynamics, group goals and relevance of an individual's role to group goals. Thus, a variety of communication methods have been used to keep organizations focused on their common goals, despite these different access levels. Each of these methods can facilitate communication, but there has still not been a unified way of bringing a group together offline and online that would enable group members to define the group structure, share information, form communication mediums and seamlessly manage new and current members without excessive overhead management. Past attempts at organizing and integrating all the varied communication tools have been inadequate.

For example, organizing and integrating varied communication tools utilizing the internet has been attempted. However, these efforts have not adequately addressed the need for a user-friendly, information-sharing resource with little group structure overhead management, which includes, along with all of the plurality of varied communication techniques, providing the opportunity for simplified sharing and networking of groups over the World Wide Web. Previous attempts in the market to present a solution to the problem of group organization and communication have had limited success.

A number of companies in the market have attempted to present a solution to the problem of group organization and communication. For example, Google offers several on-line office tools that permit a group formation interface, which allows creation of groups, setup of mailing lists, and creation of individual member profiles. Google also offers a calendar tool at a separate web address, but it is not integrated with other Google tools to enable group communication and access of the calendar. That is, the administrator or leader of a group would have to set up the Google calendar and Google email lists separately. Each user would have to be added twice, in two different systems.

In another example, Microsoft Network (MSN) groups offer group community interface that allows group formation, messaging, photo-sharing, file-management and calendars. Some features of MSN groups, such as group messaging, require the installation of MSN proprietary MSN software. This can be problematic in certain situations because many groups have users that utilize MacIntosh, Linux, or other non-Microsoft operating systems. Such users often cannot or do not want to install, usually non-compatible, software onto their computers. Microsoft Sharepoint services allows users to create a community portal wherein they can create announcement, events, links, discussion, and documents, but it utilizes Microsoft's proprietary Windows server system. Further, it has to be hosted by the group, in that, they must have their own server and a server administrator). To use all the features of a Sharepoint system, the users must utilize a Windows operating system, which puts MacIntosh, Linux, Palm and other non-Windows operating systems at a disadvantage.

A further example is Yahoo®, which offers features like Messages, Files, Links, and a Calendar. However, the creation of a YahooGroup can be difficult for many users and has limited customizing options.

The current invention provides a method and system for organizing group communications. More specifically, the current invention provides a method and system for organizing group communications wherein individuals within the group may have differing levels of communication within the group. The system of the subject invention provides penetration, assembly and integration of group membership and leadership structure into the various functionalities. The combination and summarization of features, as well as the agility of the seamless integration of all aspects of group management provide advantages to the system of the subject invention not found in prior systems.

BRIEF SUMMARY

Embodiments of the subject invention provide methods of using an integrated database management system and communication tool to provide group management and communication services through wide area networks (WAN). Embodiments of the invention can utilize computer-implemented methods and systems for uniquely organizing, integrating, and assembling the different information sharing and communication features via a user-friendly interface allowing access from a plurality of independent computer workstations after user identification. Further embodiments, of the invention can include a database server for managing members' information and data. Still further embodiments, of the invention can incorporate a graphical user interface server for interacting with users in an organization. The graphical user interfaces can be created such that they can be accessed over the wide area network using web browsers. The integrating features and user-friendly techniques various embodiments of the invention have wide application, and various desired implementations of the subject software can attain the same basic methodology of various embodiments of the invention.

BRIEF DESCRIPTION OF DRAWINGS

In order that a more precise understanding of the above recited invention be obtained, a more particular description of the invention briefly described above will be rendered by reference to specific embodiments thereof that are illustrated in the appended drawings. It should be understood that in certain situations for reasons of computational efficiency or ease of maintenance, the ordering and relationships of the blocks of the illustrated flow charts could be rearranged or re-associated by one skilled in the art. Thus, understanding that these drawings depict only typical embodiments of the invention and are not therefore to be considered as limiting in scope, the invention will be described and explained with additional specificity and detail through the use of the accompanying drawings in which:

FIG. 19 is a general layout of one embodiment for a web screen to manage calendar events.

FIG. 20 is a general layout of one embodiment for a web screen to administrate start-up messages on a group portal.

FIG. 24 is a general layout of one embodiment of a web page that can be used by group portal administrators to edit or create information presented to other users on the group portal.

DETAILED DISCLOSURE OF THE INVENTION

Figure 1:
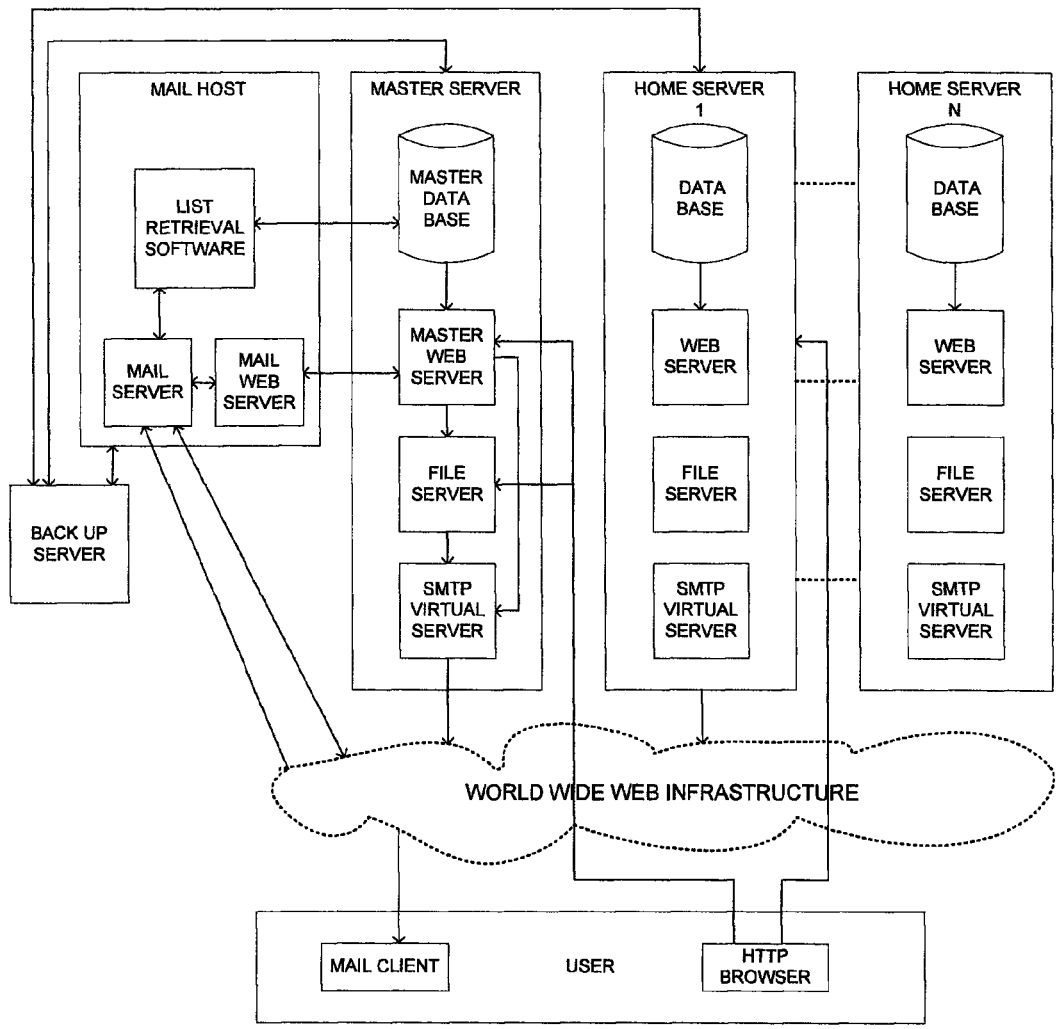
FIG. 1 is a schematic of a client server network according to an embodiment of the subject invention.

Embodiments of the invention provide a computer-implemented method and system for enabling group communication over the World Wide Web (www.) through various media with little group structure management overhead.

As used in the specification and in the claims, the singular for "a," "an" and "the" include plural referents unless the context clearly dictates otherwise. Therefore, throughout the application, the term user and users are used interchangeably and is intended to imply a single user or a plurality of users, unless specifically stated otherwise in the specification.

Computer-implemented methods and systems in accordance with the invention can allow the representation of the organizational hierarchy of the group in the electronic data structures. Each member of the group can have access to the system via uniquely assigned identification data sets. The above methods and systems enable the use of stored data to allow disseminating of electronic information to group members, as well as distributing information to remote systems based on contact information established by the members in the system. The identification data sets are used to determine the association of members to their groups and appropriate masking of information to certain members is carried out based on privileges enjoyed by the group, as well as access to functionalities established in the system. The system allows the presentation of data files, announcements, calendar events, information via emails/text messages on offline basis to specific groups. Any revision/update/cancellation of membership in groups is transparently and automatically reflected in the lists used for communicating with these groups as well as those used for allowing viewing of information by various members. This is achieved through the mechanics of list management and the algorithms employed to dynamically handle offline communications and methods used to resolve associations of members with their groups in the backend.

In a specific embodiment, each member of the group can attain access to the system via one or more uniquely assigned identification data sets. The identification data set is used to determine the association of a member to their group and provide appropriate access to information based on the group privileges, as well as, access to functionalities established in the system. Users can further be assigned to one or more access levels or roles. Roles can be adjusted as necessary when a user's responsibility changes, which can, in certain embodiments, automatically change the user's access levels.

In a more specific embodiment, the users identify themselves using one or more mnemonic identification keys. In a further embodiment, the subject system can function without the installation or update of any application software, or any support systems to a user workstation to access group portals. In this embodiment, interaction with the system can be accomplished with access to any Internet browser. This can enable the members of the group to access their group portal from geographically separated workstations. Even users with different operating systems can access their group portal with access to the world wide web (www.) infrastructure or similar wide access communication systems hereinafter referenced to by the term "internet" or "web". The supporting architecture of the system handles tasks automatically and can shield users, such as, for example, unauthorized users, from the technical intricacies that usually involve a webmaster to manipulate.

Client-Server Network and Architecture

FIG. 1 illustrates a client server network in accordance with an embodiment of the subject invention. In this embodiment, components are linked to a backup server. The backup server hosts the backup software that periodically backs up the databases and file systems on the master server, mail hosts, and home servers. The network includes a multi-server backbone architecture having one Master Server, one Mail Host Cluster, one Backup Server, and a plurality of Home Servers. The Master Server houses the Master Web Server, the File Server, the Local Outgoing Mail Server (or the SMTP Virtual Server), and the Master Database. The Master Server contains the summary information of the group website and information about which Home Server holds the group website Database and File System.

The Home Server houses the Web Server, the Database for the group website, the File System for the group website, and a Local Outgoing Mail Server. The Web Server parses the programming codes of the system and serves the website to the user. The Database for the group website contains the actual group data, including calendar items, announcements, and phone/email lists. The File System holds the group's files, such as Excel Spreadsheets and Word documents that can be shared with each other and that are stored on the GIN System. The Local Outgoing Mail Server sends out emails to group members. The File System stores the files uploaded by the group members using the Files Sharing functionality and the File Server provides access these files over the web. This integrated architecture enables agility and ease of moving a group portal from one Home Server to another in the event of excess traffic. The segregated database design features high speed, low cost, implementation flexibility, and simple maintainability.

Figure 6:
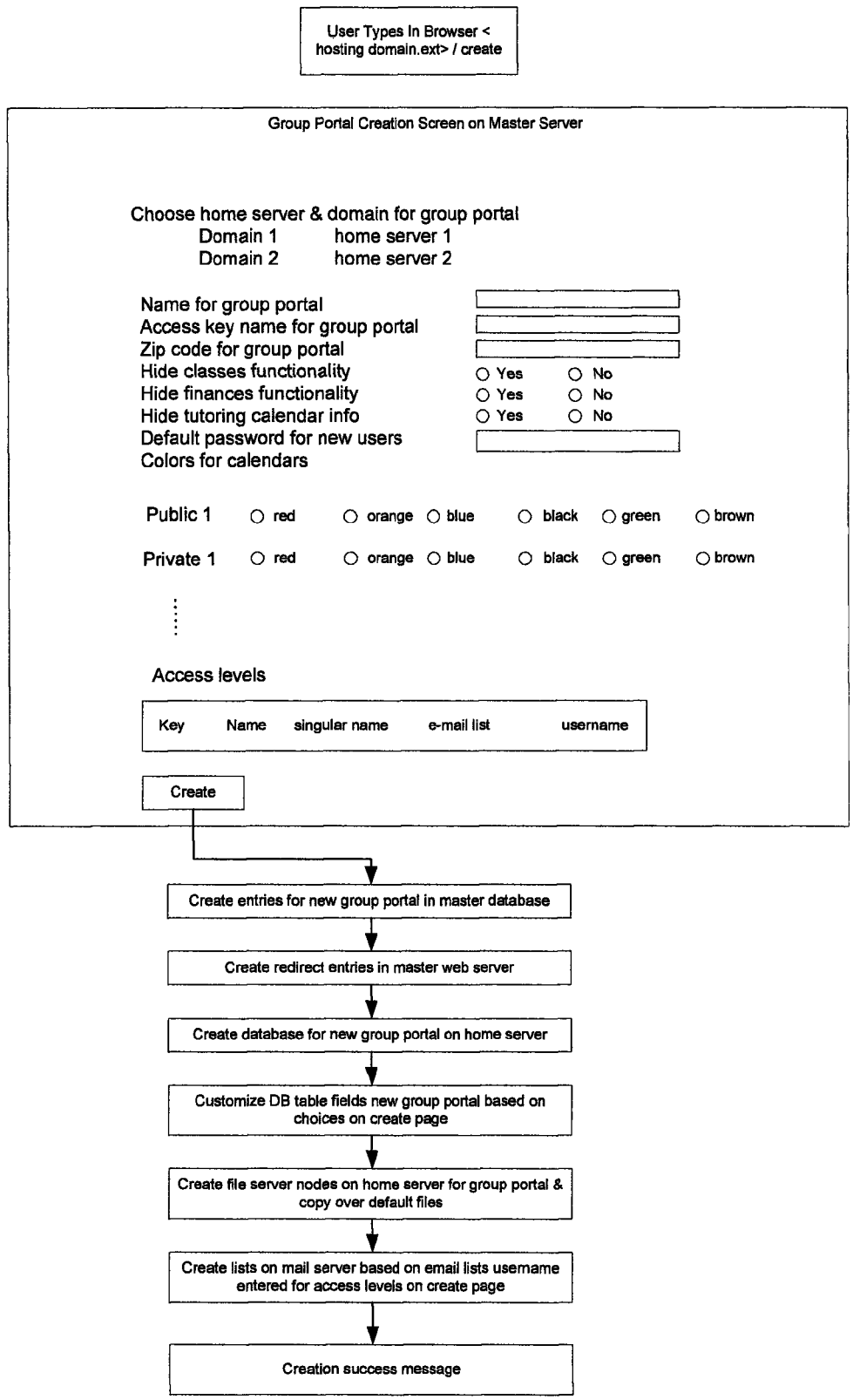
FIG. 6 is an illustration of a general layout for a web page to create group portals, according to an embodiment of the subject application.

For a group to utilize features of the system, an interface is setup using the Group Portal Creation Interface shown in FIG. 6. This interface, hereinafter referred to as the "group portal", allows authenticated access to the integrated features offered by the invention over the web. The creation process makes entries in the Master Server Database and creates the Database and File System structure for this new group portal on one of the Home Servers. The Master Server receives all client requests first, resolves the requests, looks up the specific Home Server for the given portal and then forwards the user to the appropriate Home Server. The Master Server then directs that query to the specific Home Server that houses that particular GIN System.

In a preferred embodiment of the invention, the Master Server can be housed on the same server that is also serving as a Home Server, since the Master Server's usual role is directing system traffic. Thus, a single server can contain the Master Server and a Home Server, as well as containing GIN Systems for various groups.

In another embodiment of the invention, the Mail Host can be connected to all of the databases. The Master Server directs emails to the correct Home Server. The Home Server verifies that the email came from a group member, and then sends it back to the Mail Host to be sent out to all the group members on that email list. The Mail Host then uses List Retrieval Software to send the email to every applicable user.

In another embodiment, the mail host handles the mailing lists by handing over requests to the list retrieval software. The mail web server handles administrative mailing list requests made by the master web server during creation of a new group portal. The mail server on the master server and the home server sends out mail while the mail host handles both incoming and outgoing mail.

Figure 2A:
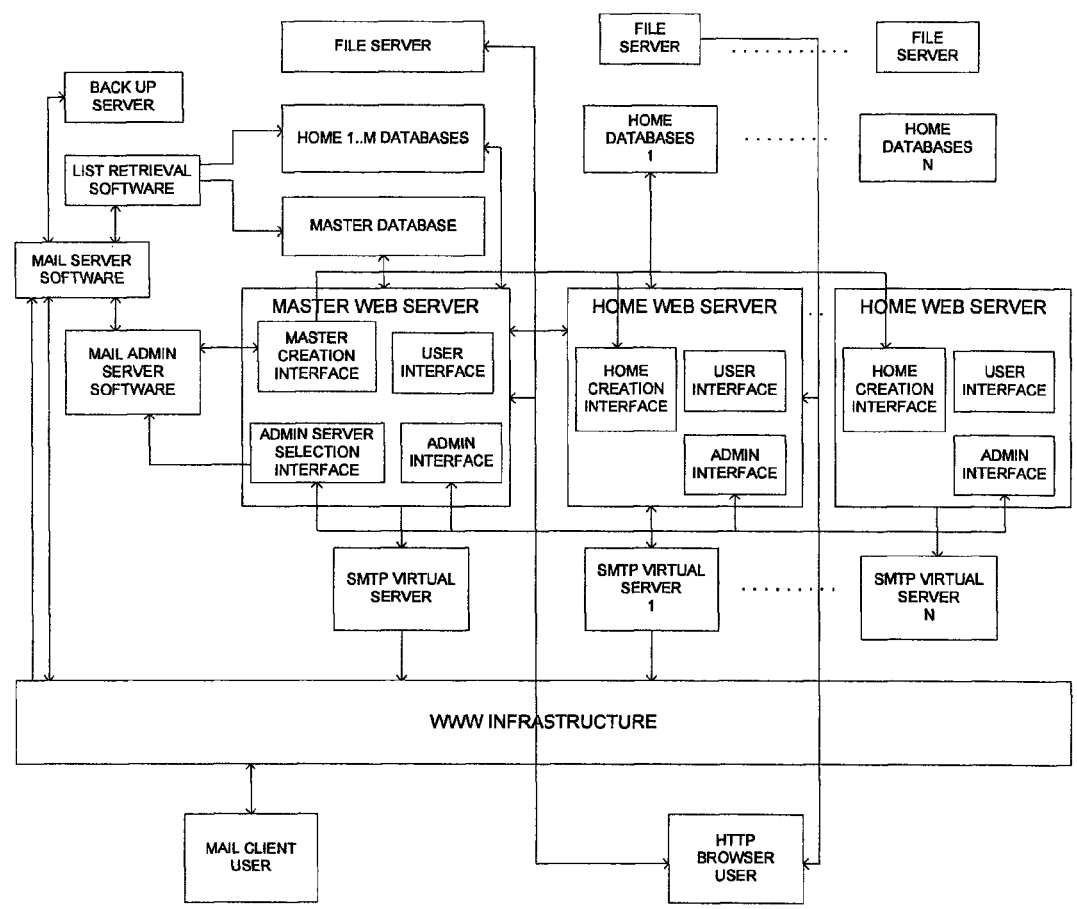
FIG. 2A is a schematic of an embodiment of software architecture of the subject invention.
Figure 2B:
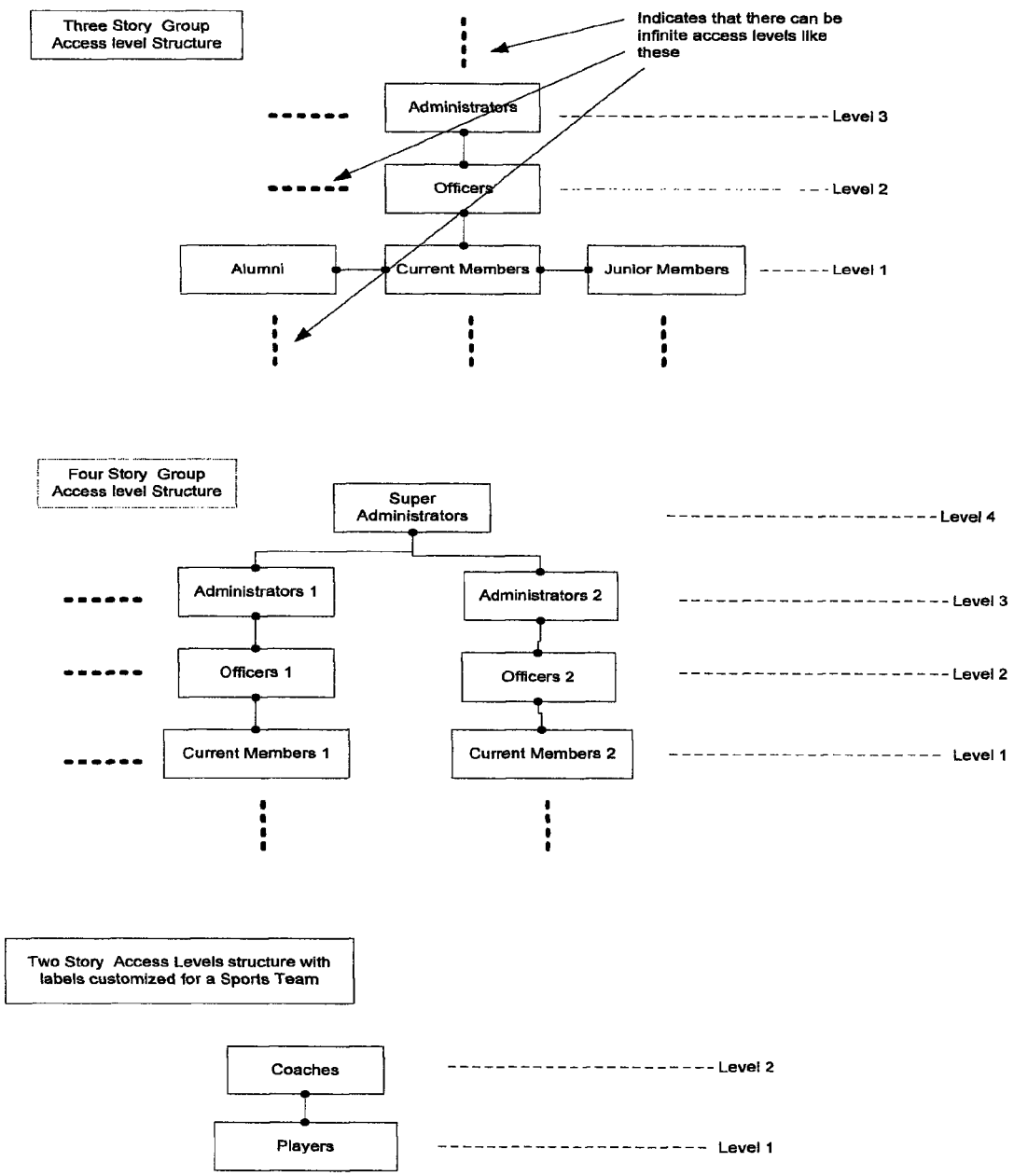
FIG. 2B is a schematic illustrating flexible group access levels according to an embodiment of the subject application.

FIG. 2 depicts the software architecture of an embodiment of the invention. In this embodiment, the Master Web Server hosts four main interfaces. First is the Admin interface, which provides the entry point to the staff control panel so that the staff personnel can view a list of home server and group portals hosted on it and go to a given home server to manage the back ends of the various group portals on that home server. The second interface is the Master Creation Interface used by the Group Portal Creation interface in FIG. 6, to create new group portals. The third interface is the Admin Server Selection Interface, which lists the portals hosted on various homes servers, allowing users to select their group's portal and forwards users to the correct home server. The fourth interface is the User interface, which enables the users to access the groups portals hosted on the Master Server itself.

In another embodiment, each home server hosts the three main interfaces providing three possible ways to access a particular GIN system. First is the Administrator Interface, which allows the staff personnel to manage the back ends of the various group portals on that specified home server. Administrator Interface is where employees of the company that maintain the GIN Systems have exclusive permission settings to log in and perform certain administrative actions in GIN, such as place advertisements into GIN and edit the Links section. This functionality is not available to group members, even if they are 'administrators' of their GIN. Second is the Home Creation Interface, which is called by the Master Creation Interface from the master server to create the new group portal's databases and file system when a group portal is created as shown in FIG. 6. Third is the User interface, which enables the users to access the group's portals hosted on the home server. Whenever a new GIN System is created for a new group, it goes from the Master Creation Interface to the Home Server where the creator would like the GIN System created. On that Home Server, the GIN System is created, using the Home Creation Interface.

Access Levels

Each group portal may contain various members falling into separate access levels. Access levels are partitions into which members are assigned. Such assignment can be based on any of a variety of factors. For example, members can be assigned to an Access Level based upon their role in a given group. By way of example, Leaders can be assigned to the 'Administrators' access level and Followers can be assigned to the 'Member' access level. In a further example, certain Members may assist administrators in managing the group. Such members could be assigned to an 'Officers' access level. In this embodiment, Officers can have more entitlements and access in a group than members, but not as much as Administrators. Other embodiments of the invention allow specification or creation of as many access levels as necessary. FIG. 2A shows examples of various embodiments of the subject invention that allow a variety of relationship structures to exist between Administrators, Officers, and Members. Any of the permutations of the default GIN model can be utilized in the design for each GIN system depending on the organizational structure and needs of any given group.

In one embodiment of the invention, the group hierarchy may be a three story access level structure. For example a group portal could have the following access levels from highest privilege status to lowest privilege status: Administrators, Senior members or officers, and Full or current members, Alumni, and Junior members as shown in the first subsection in 2A labeled 'Three Story Group Access level Structure'.

In another embodiment, the group hierarchy may be a four story access level structure. The extra level may be a top supervisory level called 'Super Administrators' as shown in the second subsection labeled 'Four Story Group Access level Structure'.

In yet another embodiment, there may be two separate groups of administrators, officers and members structure as a whole reporting as a cluster sub-set GIN system to the super administrator. These separate group clusters have access to different sets of data and functionality all easily configurable through the group portal creation interface.

In another embodiment, a group could have just two levels as shown in the example third subsection 'Two Story Access Levels structure with labels customized for a Sports Team'. In this specific embodiment, the Coaches can have the privileges of an Administrator and the player can have the privileges of Officers. In an alternative embodiment, the players can have the privileges of Members.

The naming of the access levels and features offered by the invention can easily be changed by a user that has privilege to change it, while still retaining the properties and characteristics of the group. For example, one group can call their administrators 'Coaches' while another might call them 'Team Leaders'. As shown in the third subsection, a group may choose to call the two access levels as 'Coaches' and 'Players'. This advantageous flexibility of the subject invention enables agility, and ease of use, as well as quick adoption of the system for management of group dynamics. The customizable access levels can easily be created to suit the preexisting structure of the group's chain of command.

A further embodiment utilizes three main levels of access to a default GIN: administrators, officers, and members. In this embodiment, level one can be a regular member access level. Within level one, there are three types of users: junior members, members, and alumni. When a level one user accesses the selected group portal, for example, by selecting "my menu" from an access screen, the features designated for level one are visible to the user. In a still further embodiment, level one privileges can offer links to a Main "Welcome Screen", Phone/Email list, Edit Profile, Change Password, Help, Comments/Suggestions, Give GIN to a friend, Terms of Use, and Privacy Policy.

In another embodiment, each user type can have the same level of access, but be presented with separate data sets. For example, Junior members can see a completely different home page, calendar, announcements, discussion board, files, and questions than an alumnus. The junior and alumni section can be considered, technically, as a separate GIN system. Thus, all three lateral components in level one can be considered "three" GINs in one GIN integrated seamlessly. The "three" GINs can be managed by one administrator or officer.

In a still further embodiment, level two users are officers. In this embodiment, Officers can have Level one features of GIN because they are the "member" user type by default, but they can also have a higher level of access. Thus, in addition to the features members can access, officers will have added features. Also, there can be different access to features by, for example, Members and Alumni. This separation can be important because alumni have a different agenda for accessing GIN than actual members. For example, Alumni usually don't need access to announcements and questions that the active members can see. All the data presented to each type of member is separate and customizable depending on their access level.

For example, in a specific embodiment, if an officer selects the "my menu" option on the group portal access window, there can be extra links that are hidden from level one users. Those links can be, by way of further example, Manage Questions, Manage Announcements, Manage Files, Manage Emails and Texts, and Manage Public Calendar. By allowing only a select few to have higher access levels, mistakes such as erasing a public calendar or important announcements are far less likely to occur.

In another embodiment, level three access pertains to administrator roles. It is likely that few users of a GIN will have this level of access. Again, level three access can include all the privileges of any member and of any officer and, in addition, will have the highest access level to more critical features. In this embodiment, an administrator can have extra links in addition to the member and officer features accessible to the administrator. For example, under the administrator's "my menu section" on an access portal screen there can links such as Manage Users and Site Settings. These links grant an administrator greater access to the GIN and capable of designating the levels of access that other users can have. In addition, the administrator designates what user type each individual is, for example, junior member, regular member or alumnus. In a preferred embodiment, an administrator is not required to be skilled in the art to implement these features. In this embodiment, edits and changes can be made with use of a drop down bar within the "manage users" tab, giving full range technical power to a lay person.

Thus, when the administrator designates a person as a specific level one user type, that person is automatically placed on the email list for that user type, and will see only what is available to that user type. For example, if an administrator designates Johnny as "member", Johnny will be on the email list for members, and he will see only what the members see. Also, once Johnny graduates and the administrator switches Johnny to an "alumnus," Johnny will no longer have access to the members' information (calendar, announcements, etc.), but will have full access to the alumni information and will automatically be switched over to the alumni email lists.

Interfaces

Figure 3:
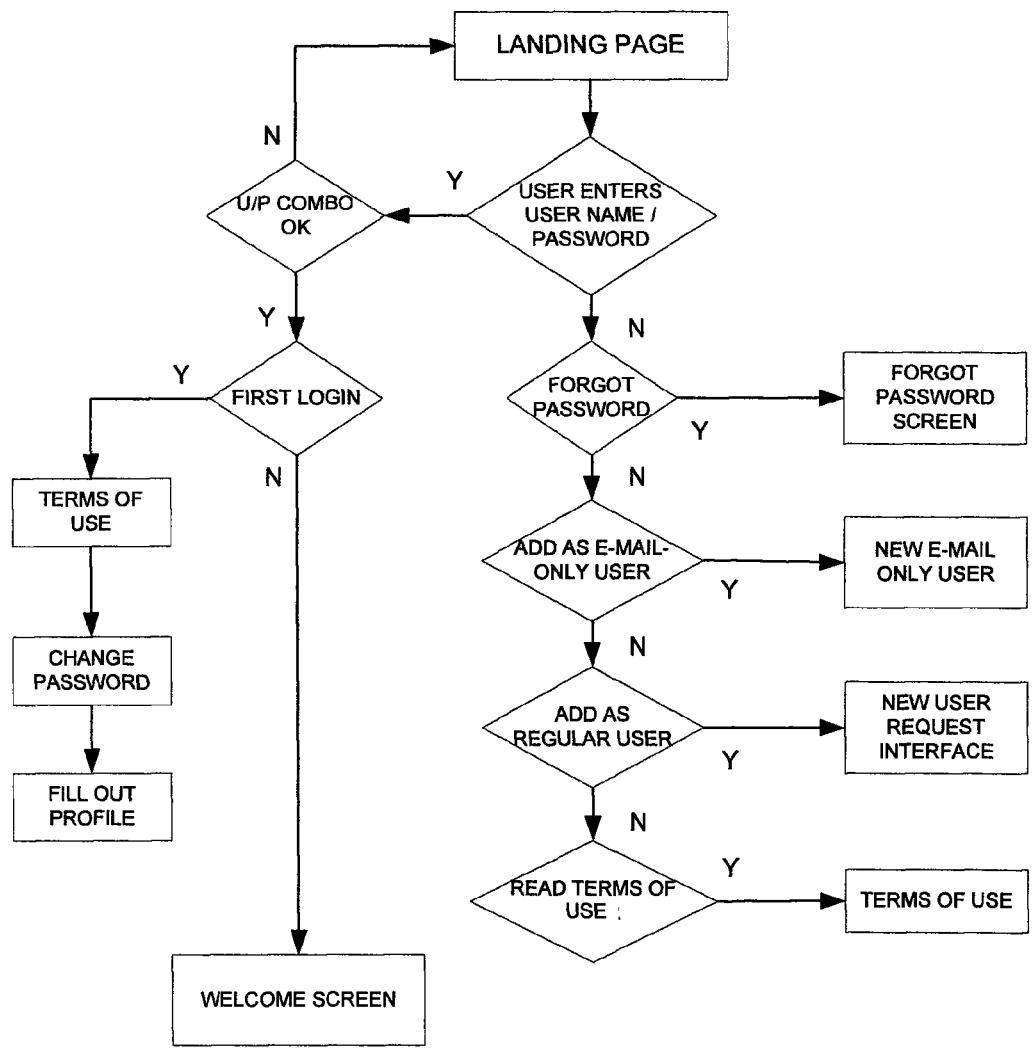
FIG. 3 is a schematic illustrating a user interface operation according to an embodiment of the subject application.

FIG. 3 illustrates the logistics of a group member signing in to access their group portal. 'Y' and 'N' intuitively stand for yes and No, respectively. U/P stands for Username/Password. When the user first types in http://www.<domain.ext>/(http://theginsystem.com) in their browser, they arrive at the landing page. On the landing page they can do four tasks. They may enter a username and password and log into the system. If the username and password supplied by the user is correct, they are taken to the welcome screen depicted in FIG. 4. If this is the user's first login, they are required to read the terms of use and then agree to them, change their passwords from the default one to a more secure one, and fill out their profile. Another task is they could choose to go to the 'forgot password screen' (which emails them a new password). They could click the link to be added as an email-only user and fill out their email address. Email-only users are the ones who receive only email communication from the group portal.

Their email addresses are added to an inbuilt email list called email-only@<groupname>.<domain.ext>. These users are not full users of the GIN System. They do not have access other than receiving emails. The final task is they could request to be added as a regular user. The administrators of the GIN System are then emailed to let them know that this event has happened, and when the administrators of the group portal log in, they see these new user addition requests and have the option to approve or deny them after looking at the information. If approved, the user is automatically emailed a username and password. If rejected, the user is automatically emailed to let them know they have been rejected.

Figure 4:
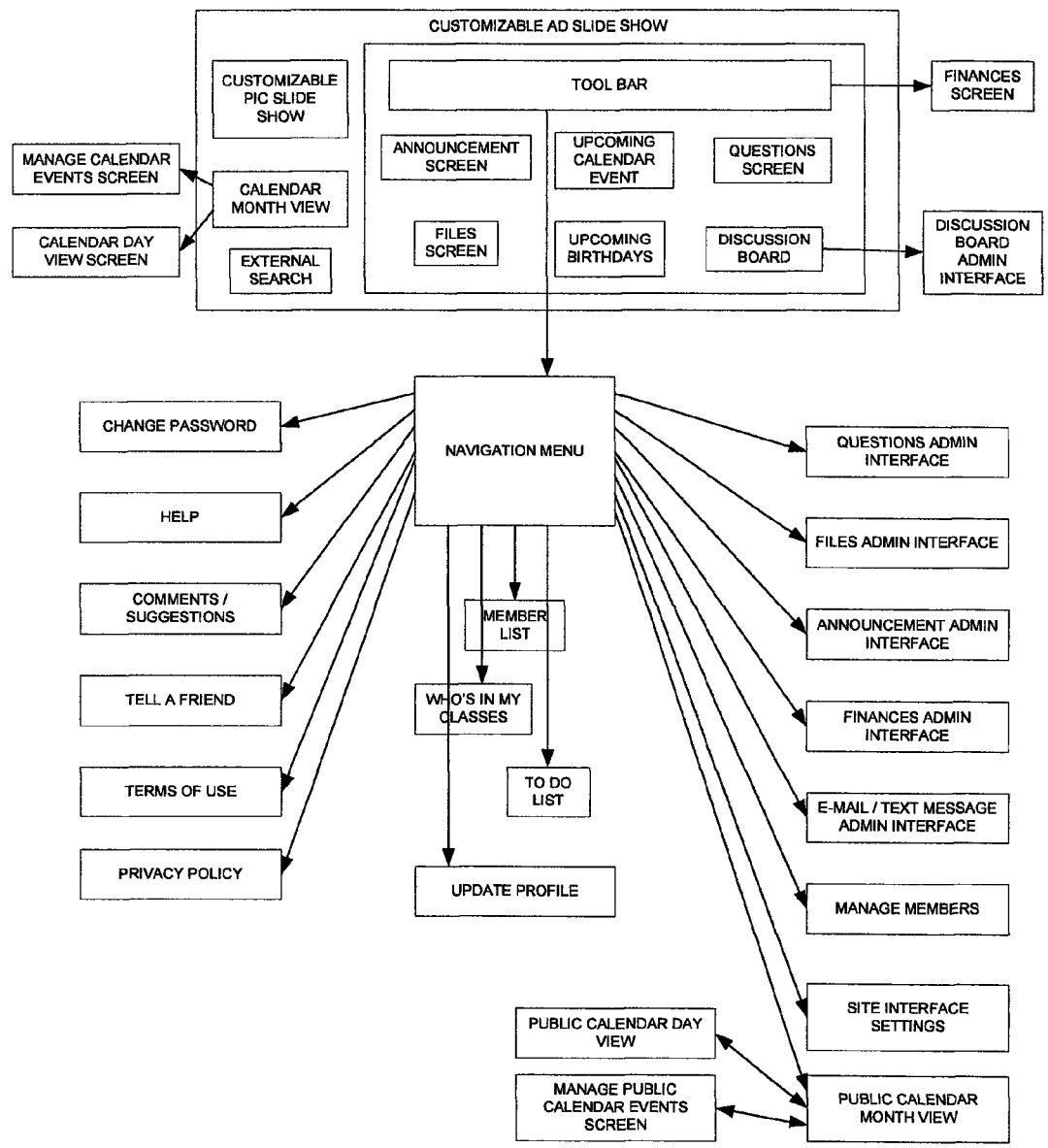
FIG. 4 is an illustration a general layout for a welcome screen or "dashboard" screen according to the subject invention.

In one embodiment, The Welcome screen or "dashboard" is conceptually depicted in FIG. 4. The hallmark of the welcome screen is the template layout that separates the screen into 4 distinct sections: top, left, right, bottom. The top section contains the customizable 'ad' slideshow in which ads from vendors are presented as a clickable set of pictures appearing one after another with a pre-defined, customizable time delay between them. The top section also contains the toolbar that leads to a navigation menu bar that allows access to the features offered by the invention. The menu bar is access level sensitive.

In one embodiment, the menu bar shows menu items available to different access levels in different colors, thus letting users with higher access levels quickly get a feel for what entitlements users with lower access levels have, thus helping their decision about what tasks they can delegate and making group administration easier. Not only are they color coded, they are also grouped by access level and labeled. The top section also shows the weather update and links to get Help on the system and Logout of the group portal.

In one embodiment, the layout and organization of the user interface has a left column section and a center section. The left section contains slideshow pictures which are completely customizable by the Administrators of the group portal. The Center section boasts six boxes to uniquely present information to summarize communication updates since the last use.

In one embodiment, the boxes summarize recent announcements, recent files, upcoming calendar events, questions that need to be answered by the user, upcoming birthdays and recent posts from the discussion boards.

Figure 5:
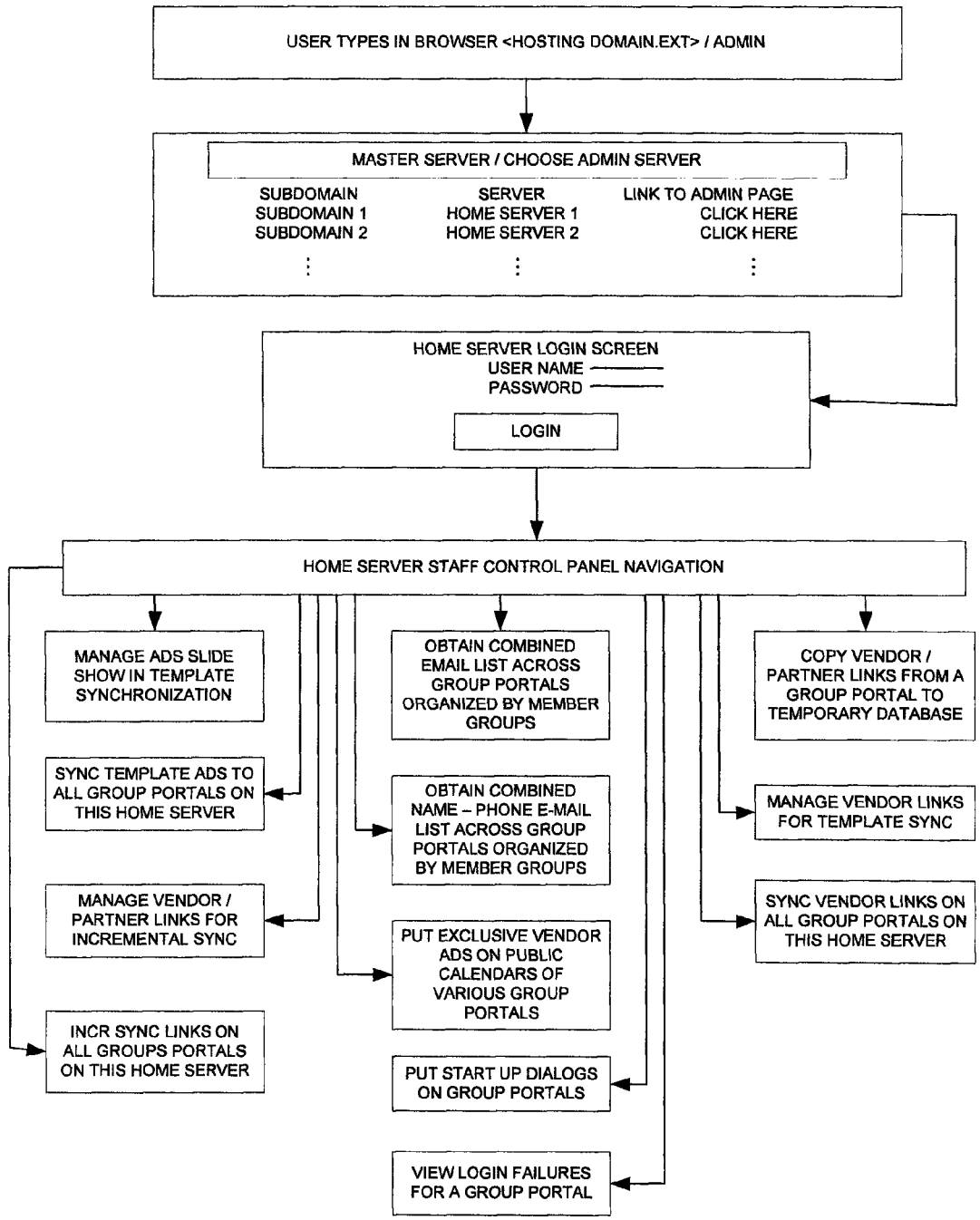
FIG. 5 is a schematic of home server administration interface operation according to an embodiment of the subject application.

FIG. 5 shows the logical layout of the home server administration interface. This interface is used to bulk-manage the backend of the group portals and perform routine administrations tasks quickly and efficiently. The employee of the company that maintains all of the GIN Systems first types in their browser http://<hostingdomain.ext/admin/>. This takes the user to the administration interface on the master server where they are shown a list of group portals and the number of home servers they are hosted on.

In one embodiment, some group portals may be clustered under a sub domain. The user selects one of the group portals. This takes the user to the home server on which that group portal is on. Now, the user is requested to enter the staff username and password to log on to that server. Once logged in, they are shown the staff control panel navigation menu that allows them to perform the various administrative functions shown in the figure.

FIG. 6 illustrates the Group Portal Creation Interface in accordance with an embodiment of the invention. This functionality is executed by the staff personnel whenever a new group portal is to be created. The interface first shows the users a list of home servers and requests the users to choose the server on which the new group portal should be created.

In one embodiment, the staff person can decide which piece of hardware to create the new GIN System on. The personnel chooses the server based on what kind of sites already exists on that server and what type the new group portal is. The user is then requested to enter the name for the group portal and a non-spaced key name for the portal. For example, if a group name is Top Key Fisher, the access key name could be like 'topkeyfishers'. The user enters a few other details, such as the zip code, and enters certain other customization specifications such as whether the group is composed of students who attend classes (and hence if the classes functionality should be hidden or not) or if the group does some kind of fee collection from its members to pay for it regular expenses. Finally, the personnel are requested to specify what the various access levels in the new portal should be named. After entering the above information, the personnel enter the secure password known only to staff and press the 'Create' button. This secure password prevents anyone else from creating new group portals. An embodiment of the invention utilizes a paid subscription base. The system executes the various behind-the-scenes tasks shown in FIG. 6, such as creating entries in the new group portal database, creating redirect entries in the master web server, creating a database for a new group portal on a given home server, and various customizations.

The Group portal creation interface significantly saves on labor and helps to significantly bring down costs for any target market. By using a common code base customizable through the interface, it is possible to suit the needs of any given group thus making the subject invention uniquely applicable and useful for any number of people that come together to form a group with a common goal.

Adding Users and Seamless Email Functionality

In one embodiment, if a user is designated a junior member, it will automatically place the junior member on the juniormembers@theginsystem.com email list for that group. The same is true for the other two user types in level one.

Each level of access has their own email list that is automatically added as seen in Table 1.

TABLE 1

| Automatically generated email addresses | Type of access level |
|---|---|
| Administrators@theginsystem.com | Administrator |
| Officers@theginsystem.com | Officer |
| Members@theginsystem.com | Member |

In one embodiment, administrators will receive emails from the members' email lists, but not the other way around. Messages of the Administrators' email list will only go to the administrators. Also, additional email lists can be created for each level of access. For example, the administrator can set up a social email list for the members or a New York alumni list for the alumni. However, if the administrator sets up an "officers social email list" for level two users, level one users will not have access.

The levels of access are in place so that general members can not alter GIN as they please. In an embodiment, an administrator does not need to be more computer savvy than a general member. For example, in order for an administrator to add a file, all that must be done is click on "manage files" link. In addition, the administrator may decide what level users have access to the file—by clicking check boxes—and can decide to send an email or text message to all the users—by clicking another check box. Thus, ease of use and automatic seamless integration is one of the main appeals of GIN.

Figure 7:
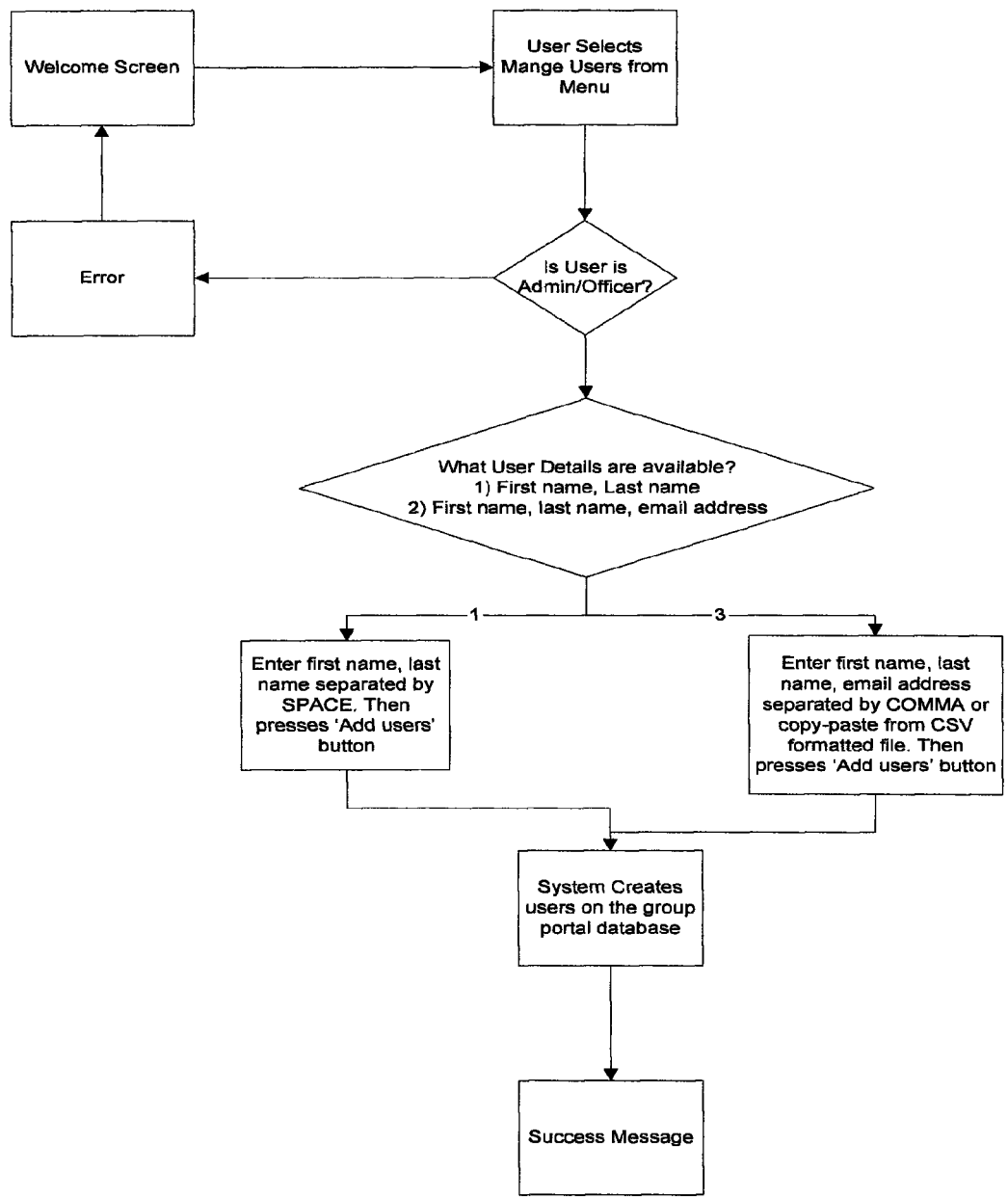
FIG. 7 is a schematic of the process for adding users to a group, according to one embodiment of the subject application.

FIG. 7 shows the flowchart depicting the process followed to add a user to the group portal. Once the group portal has been created, the administrators of the group can log in using the initial username and password supplied to them and go on to add other members of the group on their own using this interface.

In one embodiment, when the administrator is using the Add Users interface, typing just the first name and last name information is sufficient enough to automatically generate an email address for them. However, when they have first name, last name, and email information, they are prompted to copy in using comma-separated-values. This enables quick list migration. In FIG. 7, when users are created with email addresses, they are each automatically emailed to let them know that they have been added to the GIN System and they are given their individualized username and password.

List Retrieval System

Figure 8:
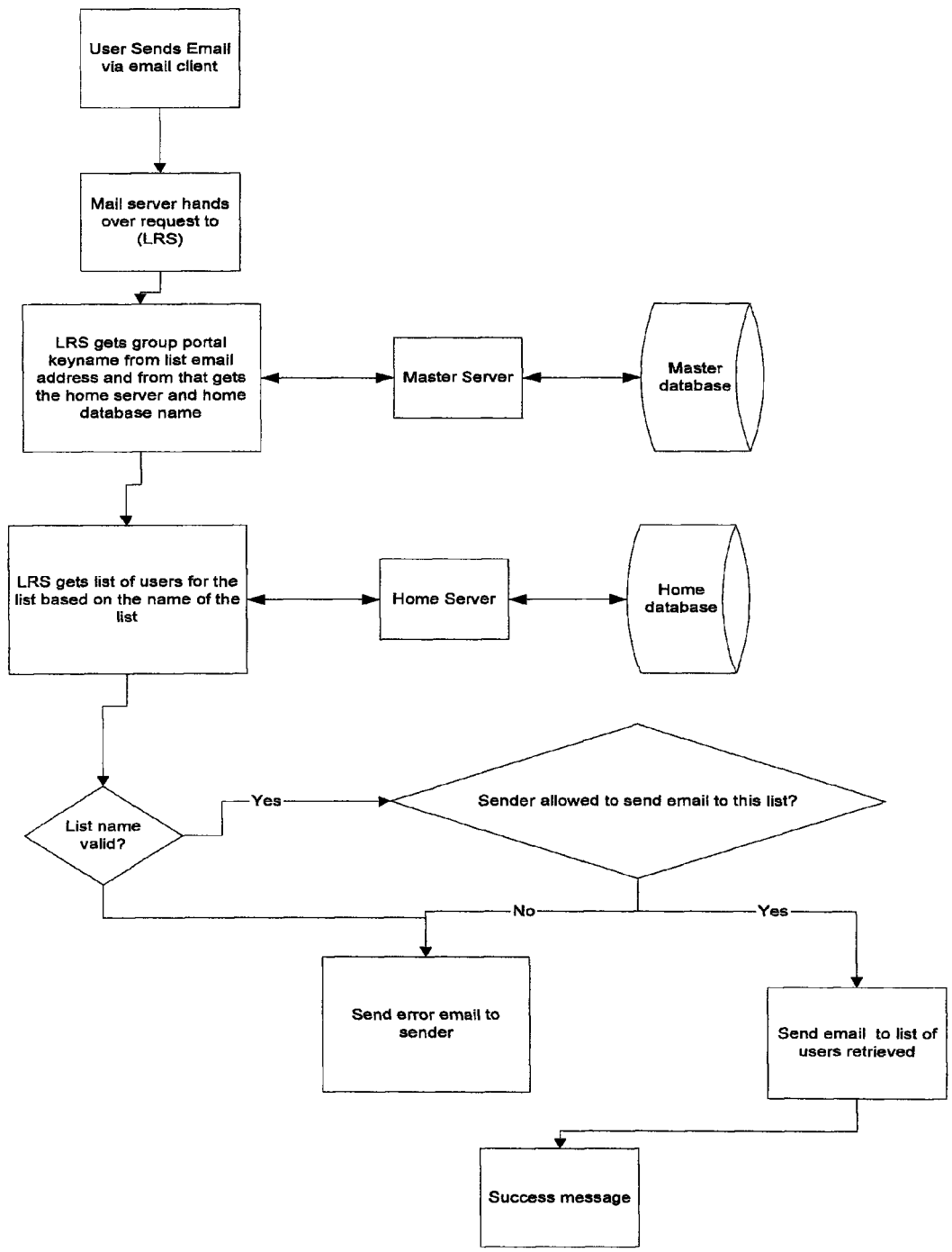
FIG. 8 is a schematic of a list retrieval system (LRS), according to one embodiment of the subject invention.

FIG. 8 illustrates the List retrieval system (LRS), which is housed in the mail host. The LRS comes into action whenever anyone wants to send an email to members belonging to specific access levels in their group. For example, if someone wanted to send an email to all rookies in the ice-hockey team (or whatever terms were chosen at the time of creation of their group portal), they would simple use an email client like Microsoft Outlook or some web based email client and send an email to rookies@icehockey.<domain.ext>.

In one embodiment, the mail host immediately hands over the request to LRS script running on an interpreted program. The LRS parses data, queries the master server and master database to find out the exact group portal this message was sent to and which home server that portal is located on. LRS then queries the home server and database to find out firstly, if there is such an access level as rookie. If the sender is allowed, the email is sent out to the list of members that LRS got before. Otherwise, an error notification message is sent to the sender saying that he cannot send to the list.

In another embodiment, users, in their profile, can check off if they want to be on any or all of the following email lists: 'weekly updates,' 'monthly updates,' 'those who reside in our residence,' 'social email group,' etc. Users can also decide the email address of each email group, when creating the email group. So, for example, users could email socialemailgroup@orlandofootball.theginsystem.com and that email would go out to all users who had checked off the check box in their profile next to the name of that email group, thus signifying that they wanted to receive those emails.

File System

Figure 9:
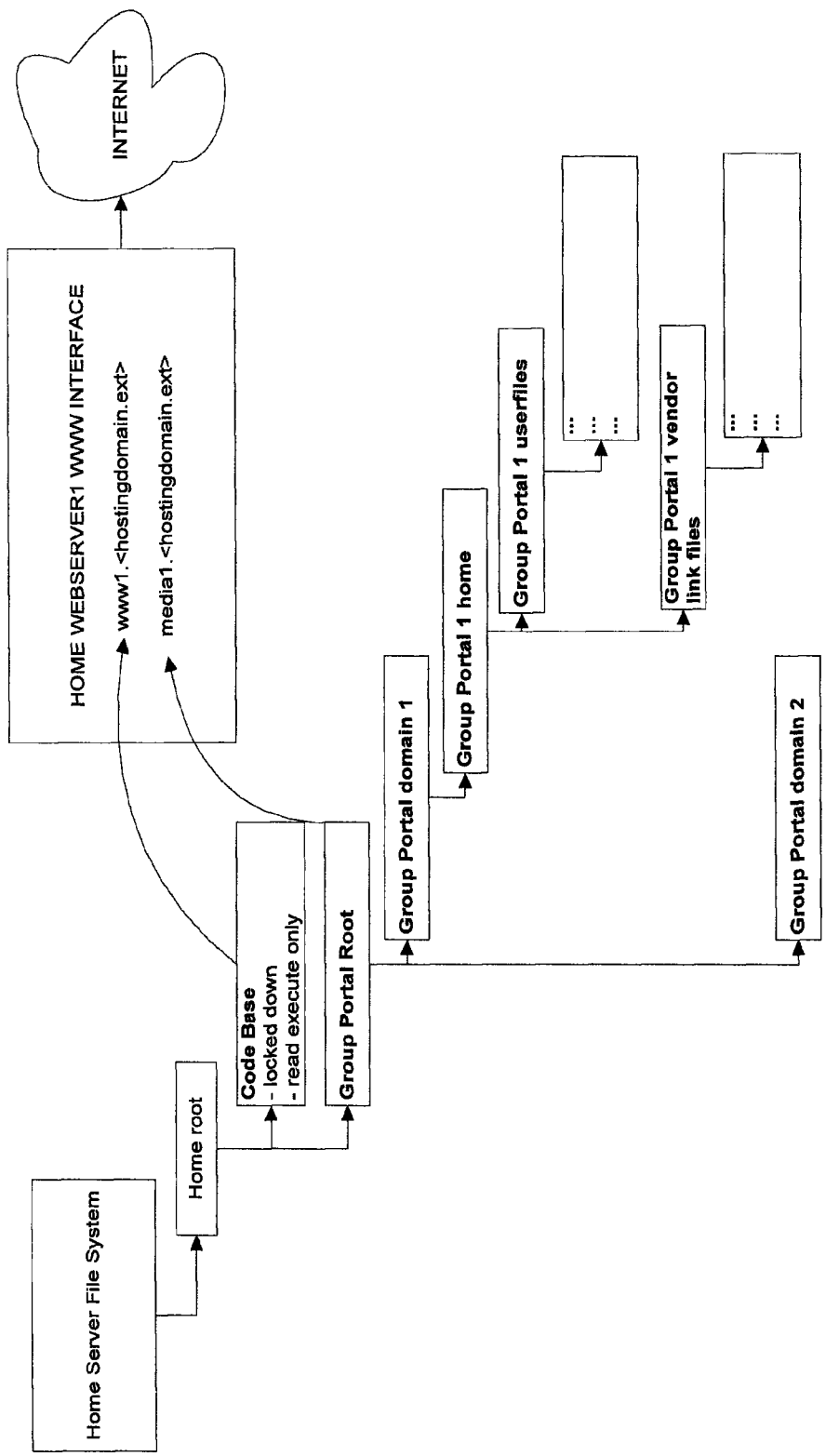
FIG. 9 is a schematic of one embodiment of the file system structure of the subject invention.

FIG. 9 shows the File System structure on any given home server. The file system houses the programming code that drives the group portals and the various configurable files uploaded by staff personnel as well as group portal members.

In one embodiment, the File System structure includes multi-level directory structures below the Home root. One set called the 'Code Base' is where all the programming code resides. This is the directory to which the servers access the interface e.g. http://www1.<domain.ext>/points. Here, only scripts are parsed by the server and web pages are served out to visitors. The second set is called 'group portal root'. This is the fileserver and the place where all the uploadable files reside in directories indexed by group key name. This separation of code from user content offers unique ease of maintainability, scalability and traffic analysis. The file server can be easily migrated to a different server, if needed. Uploadable files usually include files posted by users and those meant for vendor links and advertisements for that group portal.

Email and Text Messaging

Figure 10:
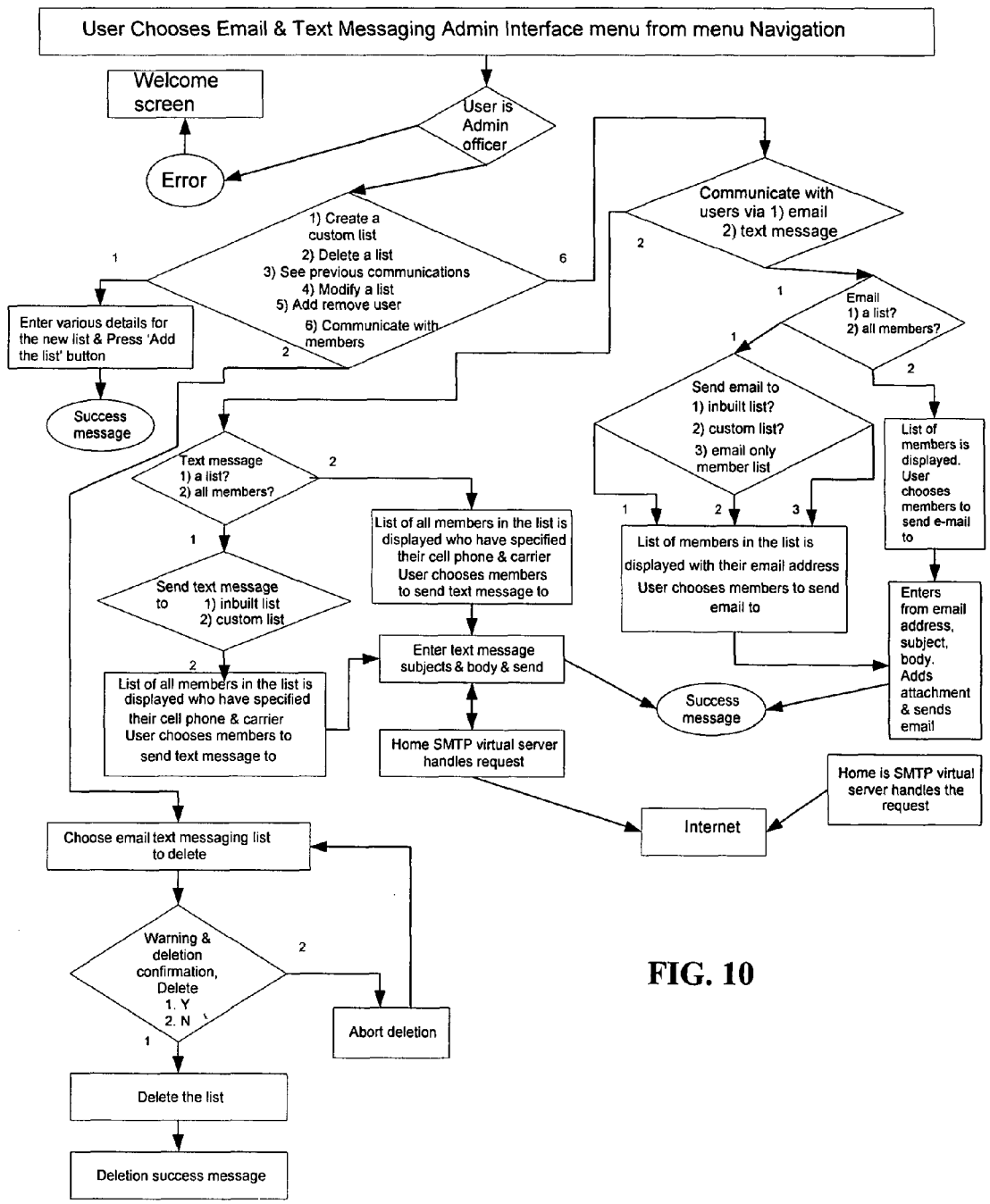
FIG. 10 is a schematic of the logical layout for an administrative interface to oversee email and text messaging within a group, according to one embodiment of the subject invention.
Figure 11:
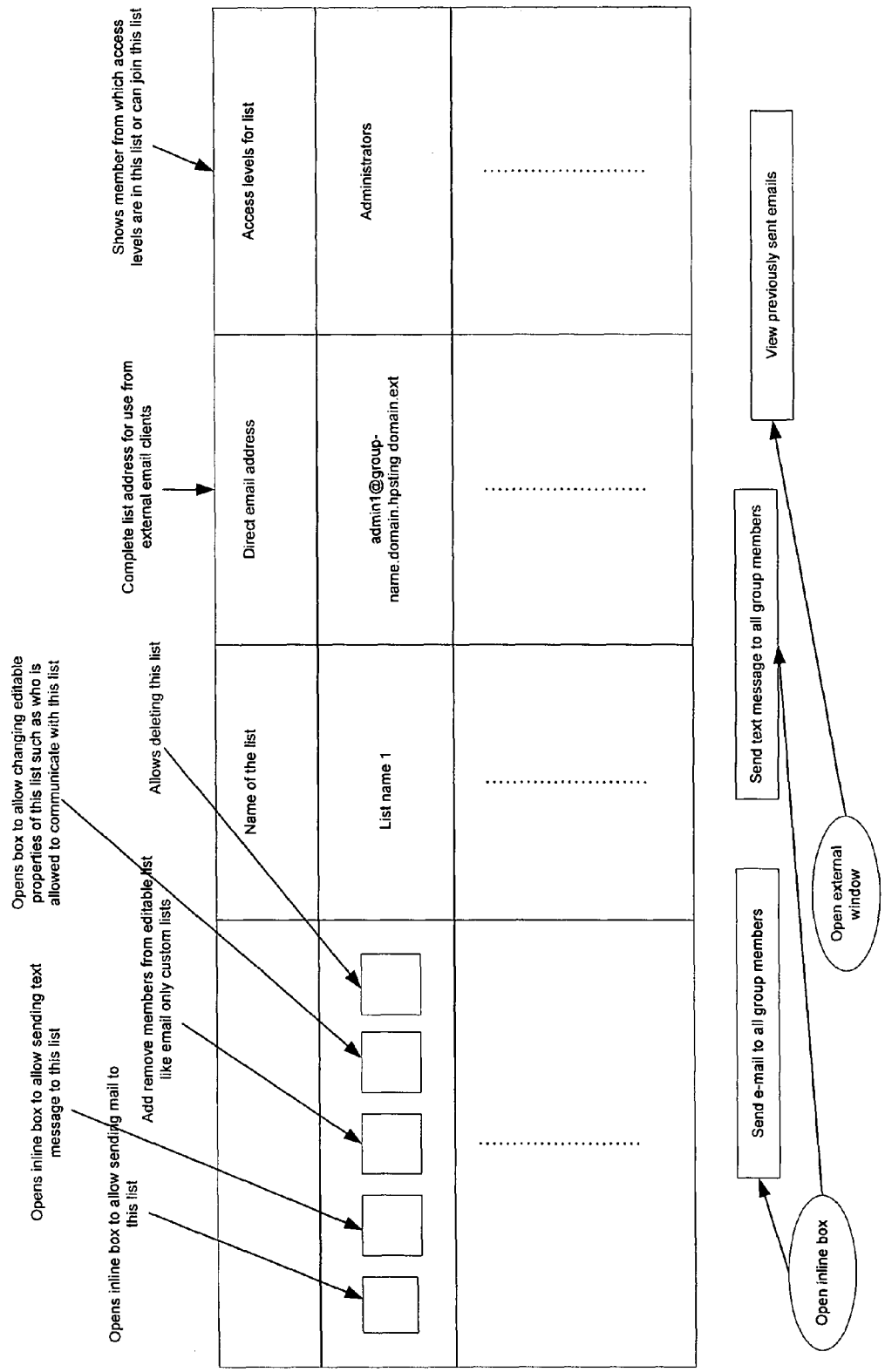
FIG. 11 is a schematic of the physical layout for an administrative interface to oversee email and text messaging within a group, according to one embodiment of the subject invention.

The Logical Layout of Email and Text Messaging Administration Interface is presented in FIG. 10. The user is allowed access to this functionality only if they have privileged entitlement defined in the access level they belong to. Aptly named, this interface allows the user to send out email and text messages to various lists. FIG. 11 shows the Physical Layout of Email and Text Messaging Administration Interface.

In one embodiment, there are three types of lists. Inbuilt lists, User created lists (also called custom lists), and email-only lists are the three types one can create. Inbuilt lists and user created lists are composed of members of the group's portal while email-only lists are composed of people who do not have any access to the group portal but just receive emails from the group portal.

In one embodiment, the names for the inbuilt lists are specified at the time of the creation of the group portal. The administrators list contains all members who belong to the access level "administrators". Similarly, the rookie list (if so named) will contain all members who have access level "rookies (if so named otherwise 'junior members')".

Figure 12:
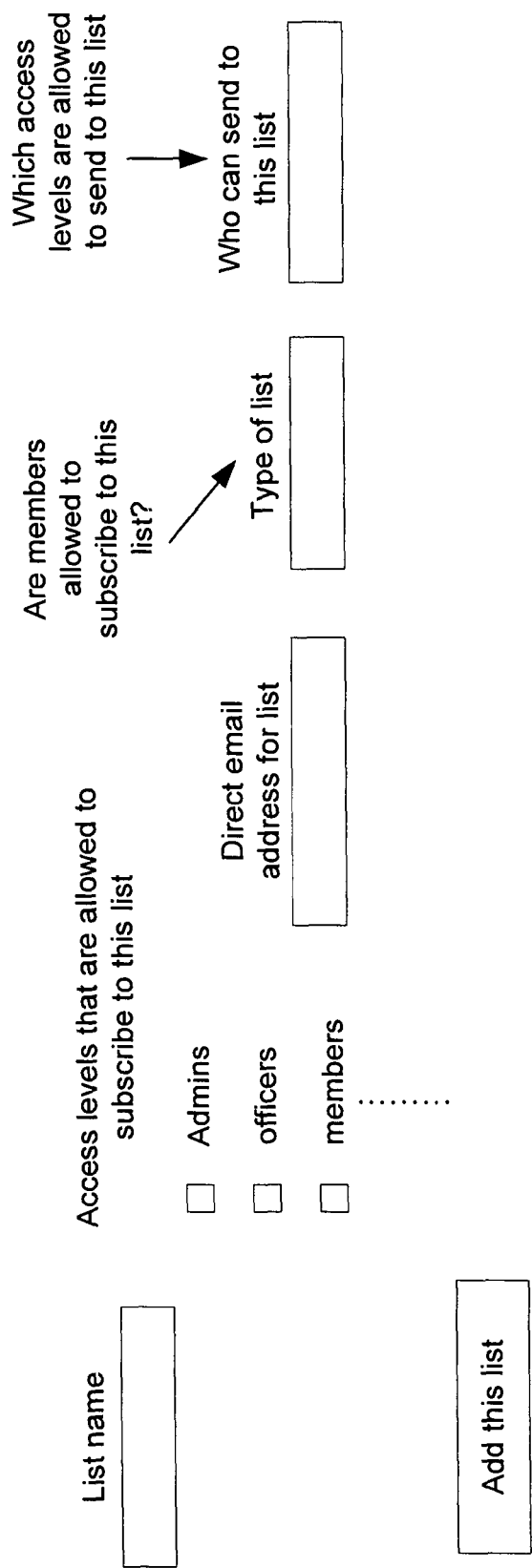
FIG. 12 shows a general layout of a web page for the creation of custom group lists, according to one embodiment of the subject invention.

In another embodiment, user-created lists are those created by group portal administrators using the interface shown in FIG. 12. Both emails and text messages can be sent to inbuilt lists and user-created lists. Text messages are sent out by using the cell phone/pager number and carrier information filled out in the profile. The email and text messaging interface can restricted to administrator/officer level access only and allows the member to create a custom list detailed in FIG. 12, delete a list as detailed in FIGS. 10 and 11, see what communication has been made in the past with these lists detailed in FIG. 13, modify the details of a list as shown in FIG. 14, add/remove users from a list as shown in FIG. 15, communicate with the lists as detailed in FIG. 10 in flow 6. FIG. 11 illustrates the various lists listed along with the direct email address that can be used to email these lists using external email clients. For text-messaging, the group portal interface has to be used and cannot be done using external clients. Apart from using the list, the buttons labeled "Send email to all group members" and "Send Text Message to all group members" can be used to communicate with all the members. FIG. 12 illustrates the physical layout of the Create Custom Lists Screen.

Figure 25:
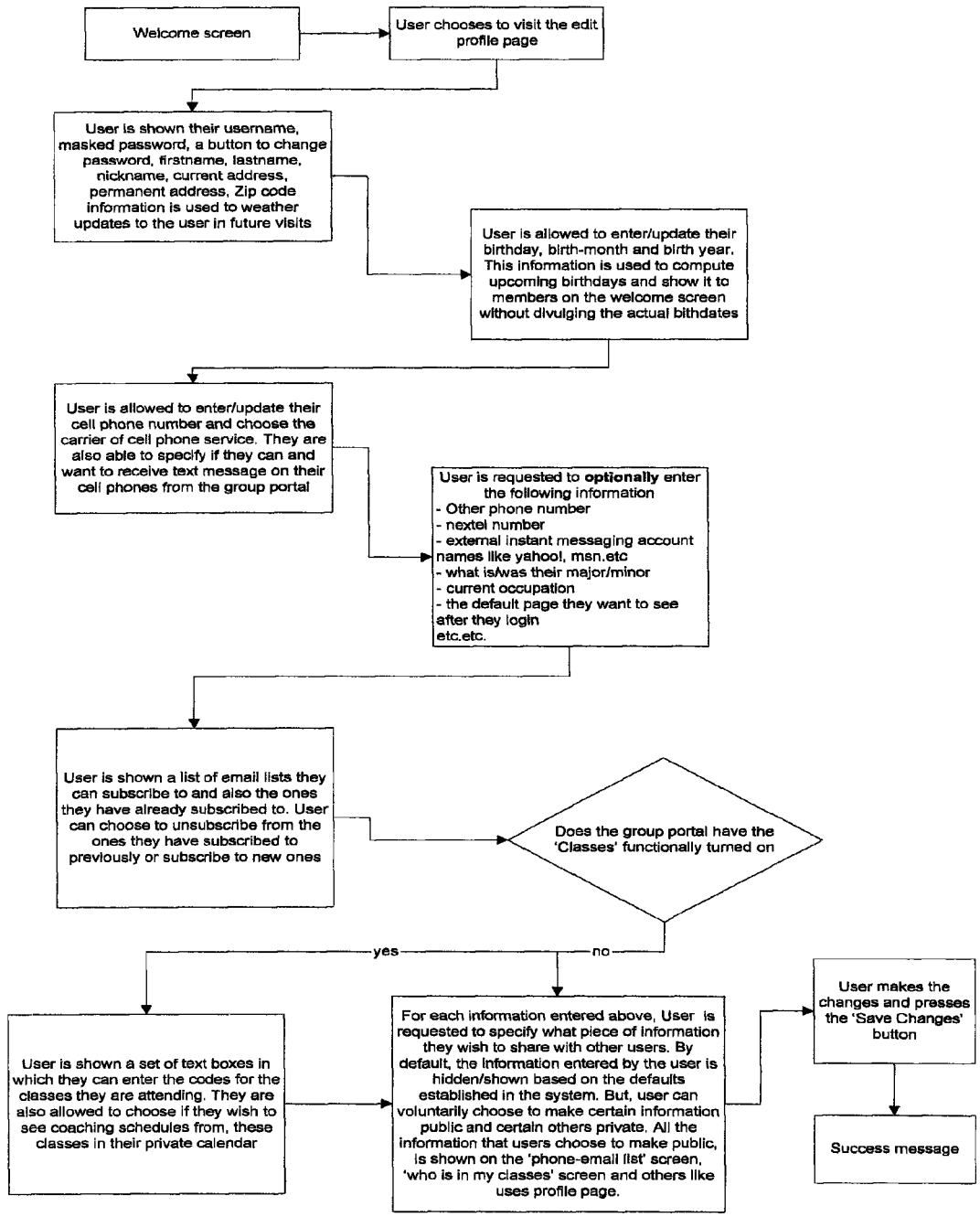
FIG. 25 is a schematic showing how group portal users can edit their profile on a group portal.

In one embodiment, the user is requested to enter the list name, which access levels are allowed to subscribe to this list, the direct email address they would want for this list, if members are allowed to subscribe to this list and what levels of users can send email to this list. Once this list is created, all members belonging to the access levels, when they log into the group portal and go to their profile update screen shown in FIG. 25 are shown these email lists as available from them to subscribe.

In another embodiment, the administrators may also choose to add members manually to user-created lists by using the Interface shown in FIG. 15. They can also choose to make the email lists 'private' such that users must be added to the email list.

Figure 16:
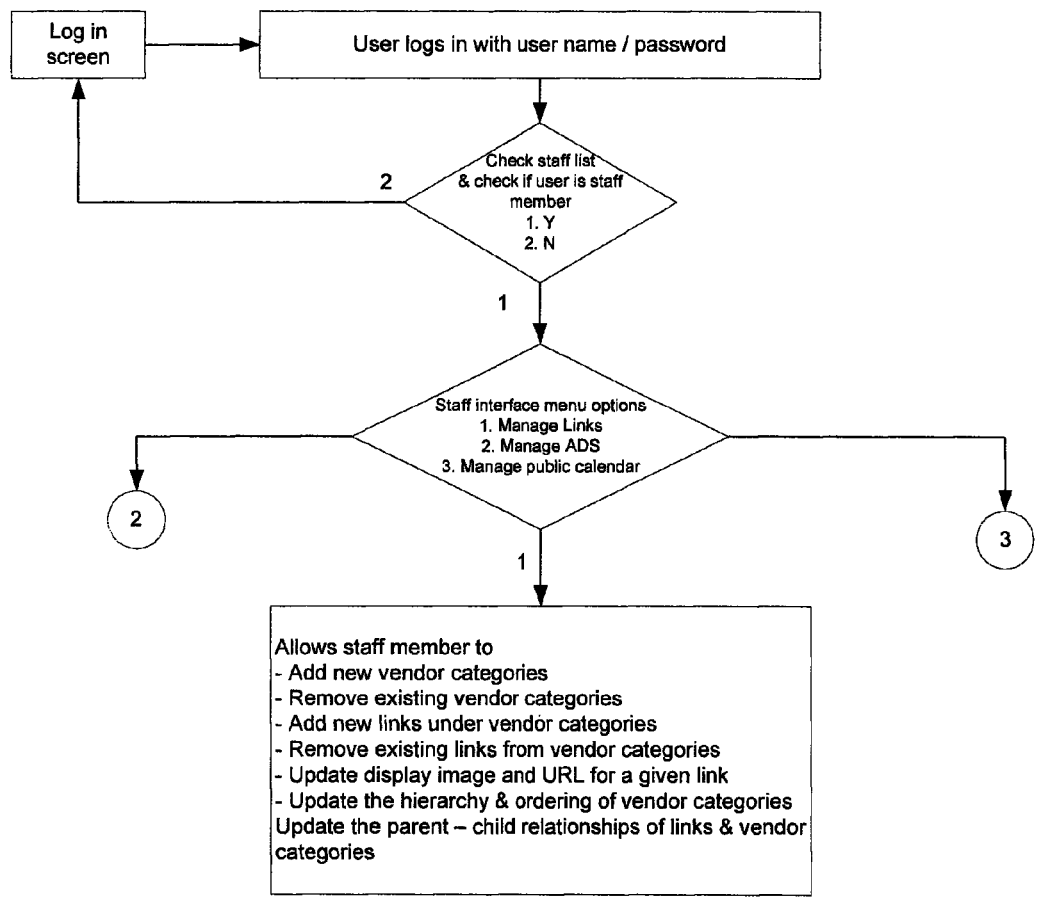
FIG. 16 is a schematic showing how, in one embodiment, a staff member of an organization can access an individual group portal and, given certain access rights, perform administrative tasks commensurate with those access rights.

In another embodiment, the manage user interface allows modifying current members. When an administrator changes a user's access level on the 'Manage Users' page from a 'student member' to an 'alumni member', that user immediately has no access to the regular member information (calendar, discussion board, announcements, questions, email groups, files, etc.) and immediately has access to all info for an 'alumni' user (calendar, discussion board, announcements, questions, email groups, files, etc.) exclusively. FIG. 16 presents the Staff Interface to individual group portals. As shown, employees of the company have inherent, restricted, inbuilt access to back ends of all group portals so that they can perform maintenance tasks like updating ads in the backend, updating links, or putting ad events on group public calendar. The last process box in FIG. 16 details the various actions allowed on the vendor links update interface shown in FIG. 17.

Figure 17:
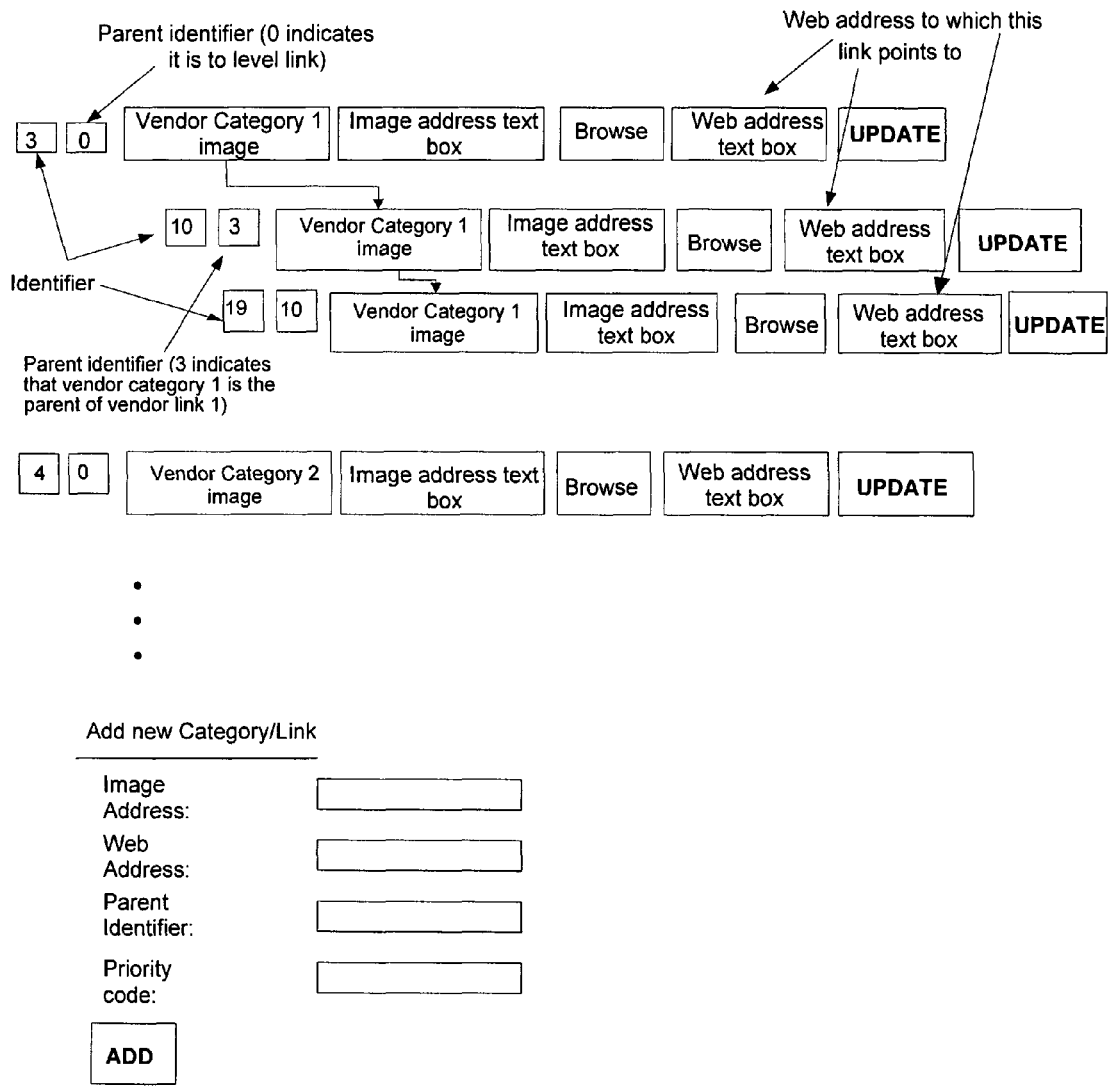
FIG. 17 is a schematic showing how, in one embodiment, a vendor for an organization can access a group portal and, given certain access rights, obtain or provide information to the group via the portal.

As depicted in FIG. 17, links are essentially multilevel hierarchical mouse-over advertisements menus. The first level is called Vendor Categories level. The subsequent levels represent single level or multilevel advertisements. Each advertisement is represented by a vendor supplied image and when clicked takes the user to the specified vendor's website. In addition, there is a special access login for company employees to change ads on the backend (through the staff control panel), without having to have access to the system of the group. This increases the security of the system for the group.

Figure 18:
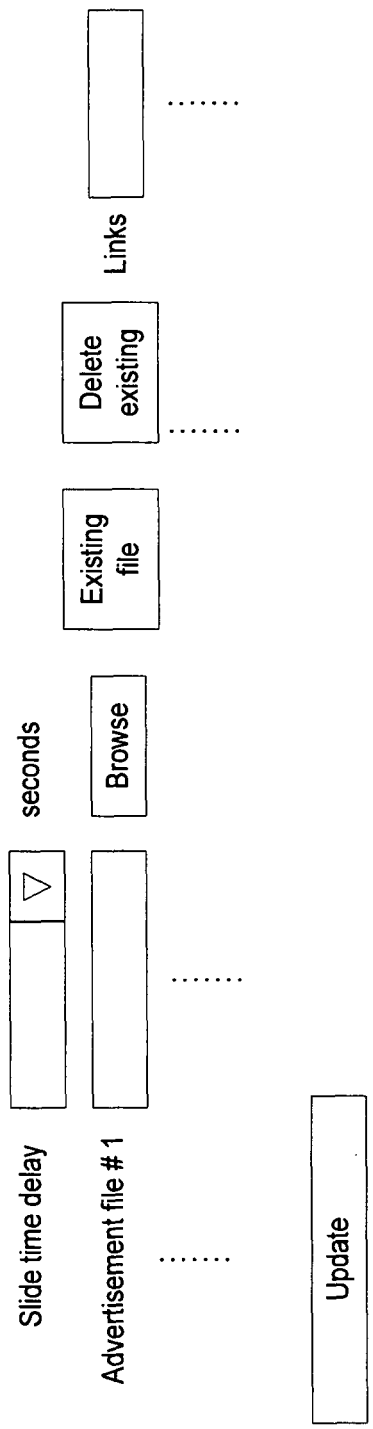
FIG. 18 is a general layout of one embodiment for a web screen to manage slide show advertisements.

In one embodiment, each link has image attributes that show up for that link, the address of that link, if this link is a top level link or has parent links and if this link has more link beneath it in its hierarchy. The scheme shown in FIG. 17 allows capturing these details as well as the parent child relationships of links using a set of two codes one called identifier and other called the parent identifier. The bottom part of FIG. 17 shows the details that need to be entered before a link can be created. FIG. 18 shows the physical interface used to manage slide show ads.

FIG. 19 shows the Manage Calendar events screen. The Calendar shows events in different views with custom colors and access levels, operating in private and public mode. Each calendar event is clickable with the link pointing to a customizable web address. Events are added to the calendar through the 'Manage calendar events' screen. Events can be recurring or one time. Recurring events are those that occur everyday, or every given day for every week in a month, or every specified number of days of a month or year. Events posted can be private or public depending upon the context in which the calendar is being viewed. Private events are posted by a user and are only seen by that particular user. In contrast, public events are posted by administrators and are visible to all members who belong to the access level group for which the event has been posted. A hockey game is an example of a public event.

In one embodiment, events can also be added or moderated through the staff control panel. Events added in such a way usually include vendor advertising events. Users can also choose to notify the members immediately of the event and description. Based on information entered by users in their profile and based on their option, users are also shown recurring events from local vendors offering local service of value to the members in the group portal. Such events are shown in a different color to distinguish them from other events. This is primarily accomplished by pulling the schedule date in a predefined format from vendor's website and merging it into the members' calendar. An important point to note is that these events are only shown if the member chooses to view such events thus offering great flexibility to the member while offering a great advertising venue for vendors' partners.

Figure 21:
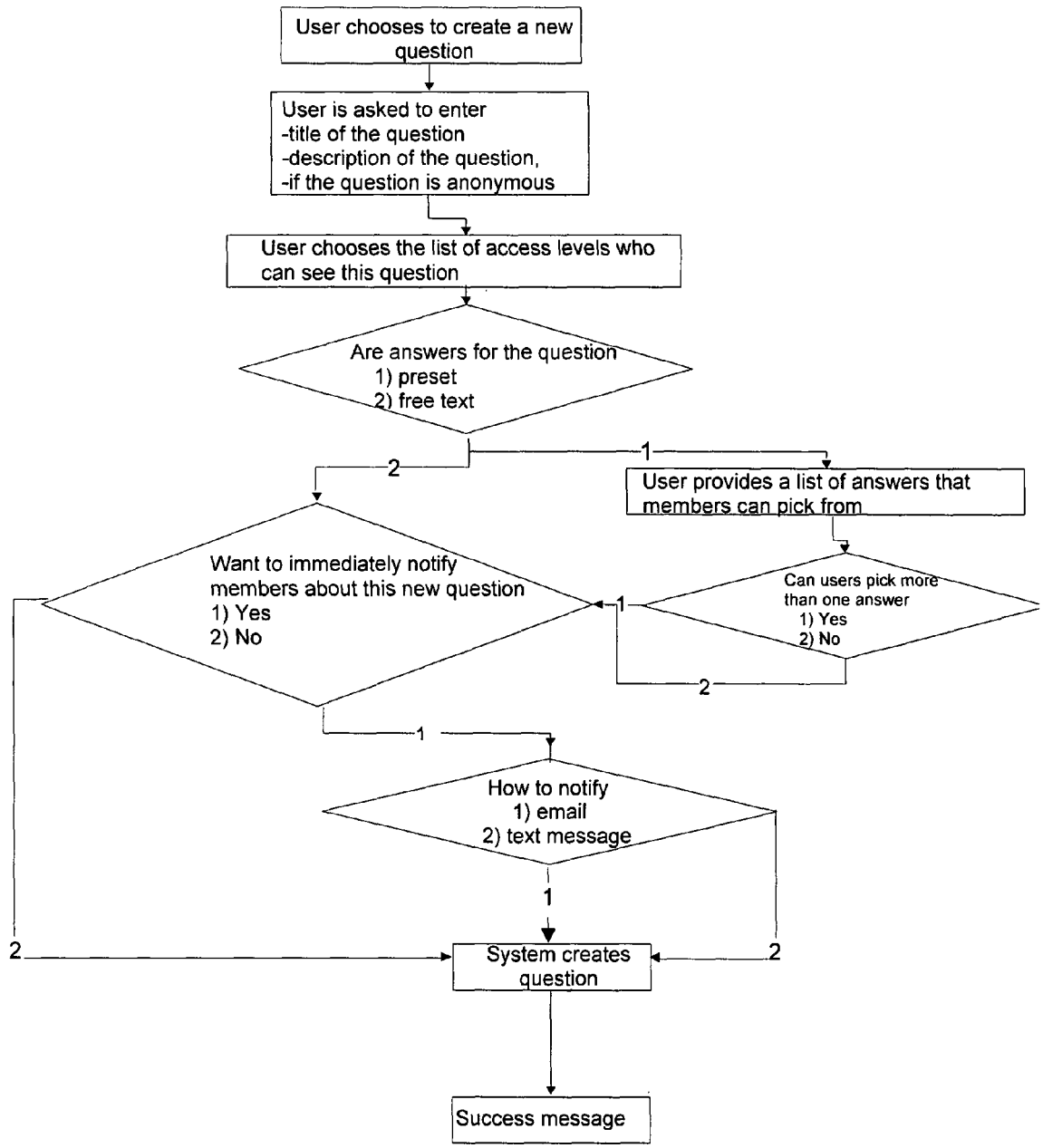
FIG. 21 is a schematic showing how a user with administrative rights can create and add questions to a group portal, according to one embodiment of the subject invention.
Figure 22:
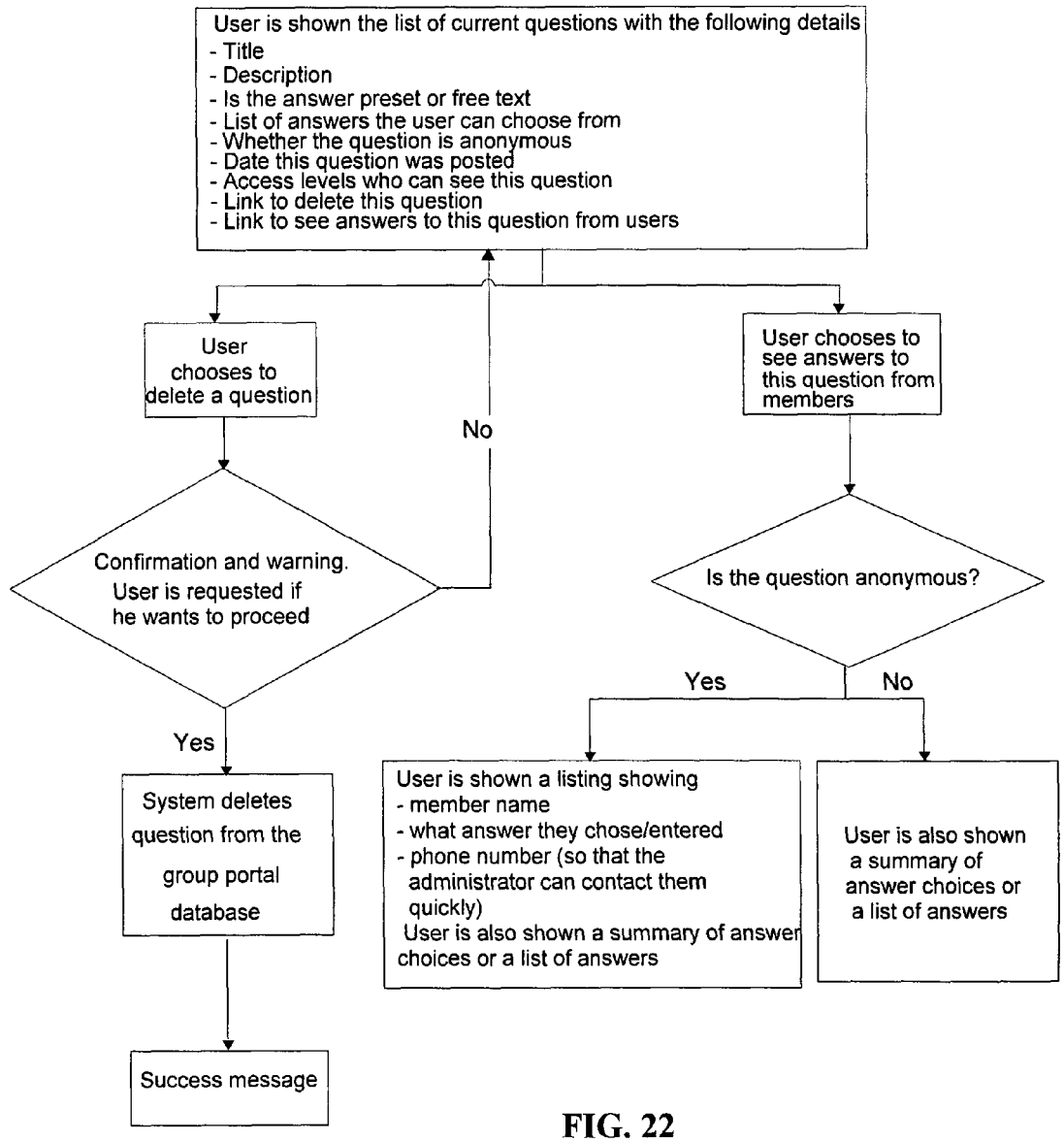
FIG. 22 is a schematic showing how a user with administrative rights can edit or delete questions on a group portal, according to one embodiment of the subject invention.
Figure 23:
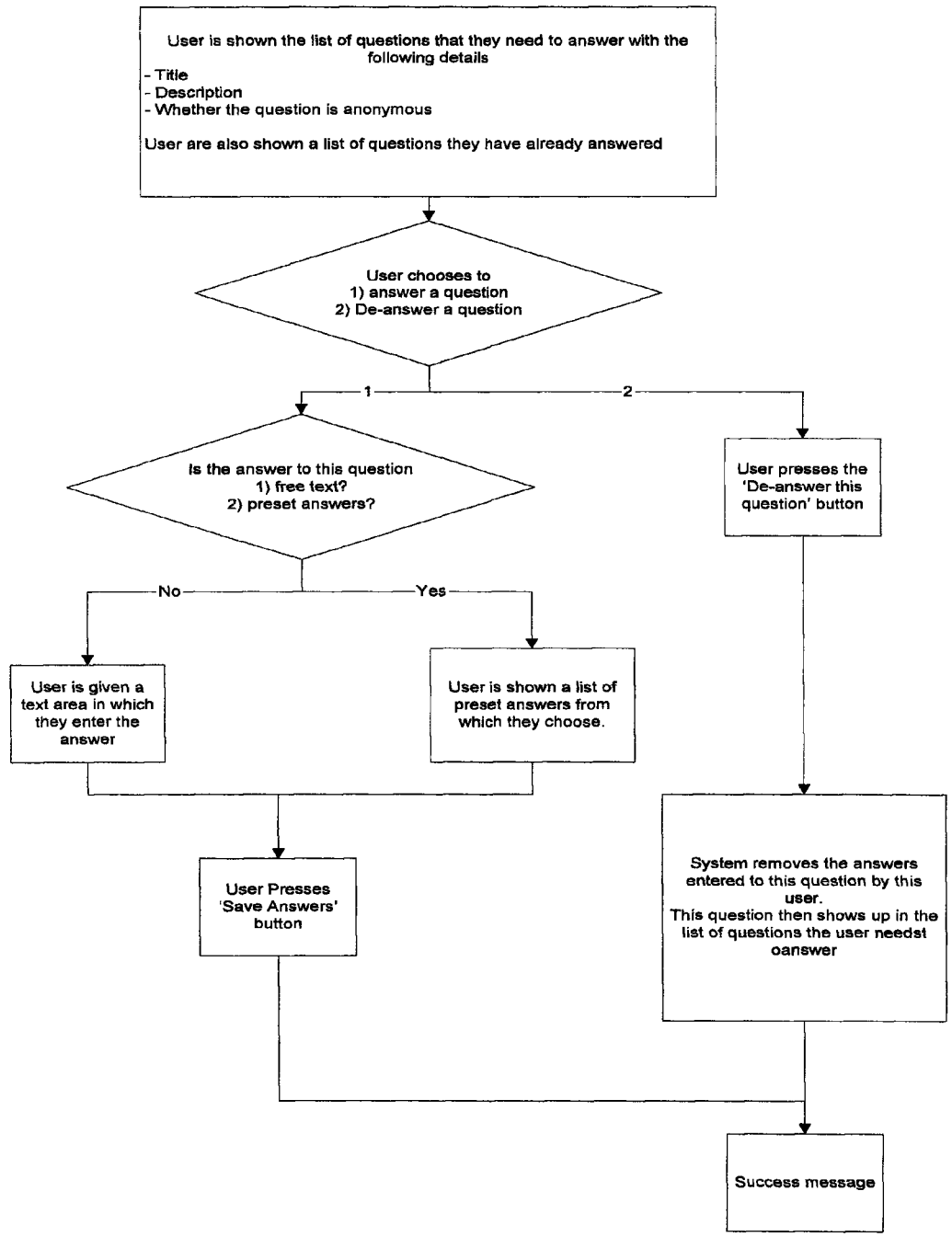
FIG. 23 is a schematic showing how a user can interface with a group portal to access questions and answers.

FIG. 20 shows the interface for posting Startup messages on any given group portal. Start-up Messages dialog boxes provide an easy way to communicate one-way with members in a given portal belonging to a particular access level. Examples of such communications include notification of new features in the system, important changes to certain functionalities, maintenance events, or some particular tasks that all administrators need to perform or serving reminders once they sign into the system. This method enables the staff to put on such messages on numerous group portals and even sometimes hundreds of them in a few minutes. Once the members have seen the start up message, they are not shown that same message again the next time they login. The message comes up in a dialog box that the user must click 'okay' on in order to continue in the group portal. This message can be set through the staff control panel, which means that any employee can login and do this without having access to any group portal and without any formal training. The Administration interface for Adding Questions has been shown in FIG. 21. For maintaining current questions the user can delete questions or choose to see answers to the question from members as depicted in FIG. 22. The members interface to answers current questions is depicted in FIG. 23.

In one embodiment, users are allowed to input questions that are either free text or preset answers and then quickly inform relevant groups about this question via email/text messaging. Answers chosen by users are presented in an easy to absorb format summarized by choice of answers.

FIG. 24 illustrates the Site Settings screen. This screen allows members with administrative access to change the welcome message that appears on the login screen or landing page. The user simply uses a WYSIWYG (What You See IS What You Get) text editor to prepare a colorful formatted message and thus customize the landing page to suit their tastes. The 'force users to change passwords' button allows the administrator to run a quick script that will essentially force every user to change their password the next time they login. A feature like this helps remind the entire group about the need to change passwords regularly and force it gracefully. Groups who are sensitive about their information can specify the desired amount of inactivity time after which the member will be logged out of the system. This prevents intruders from gaining access to the system by accident. FIG. 25 shows the logical process followed by a user in updating their profile.

Figure 26:
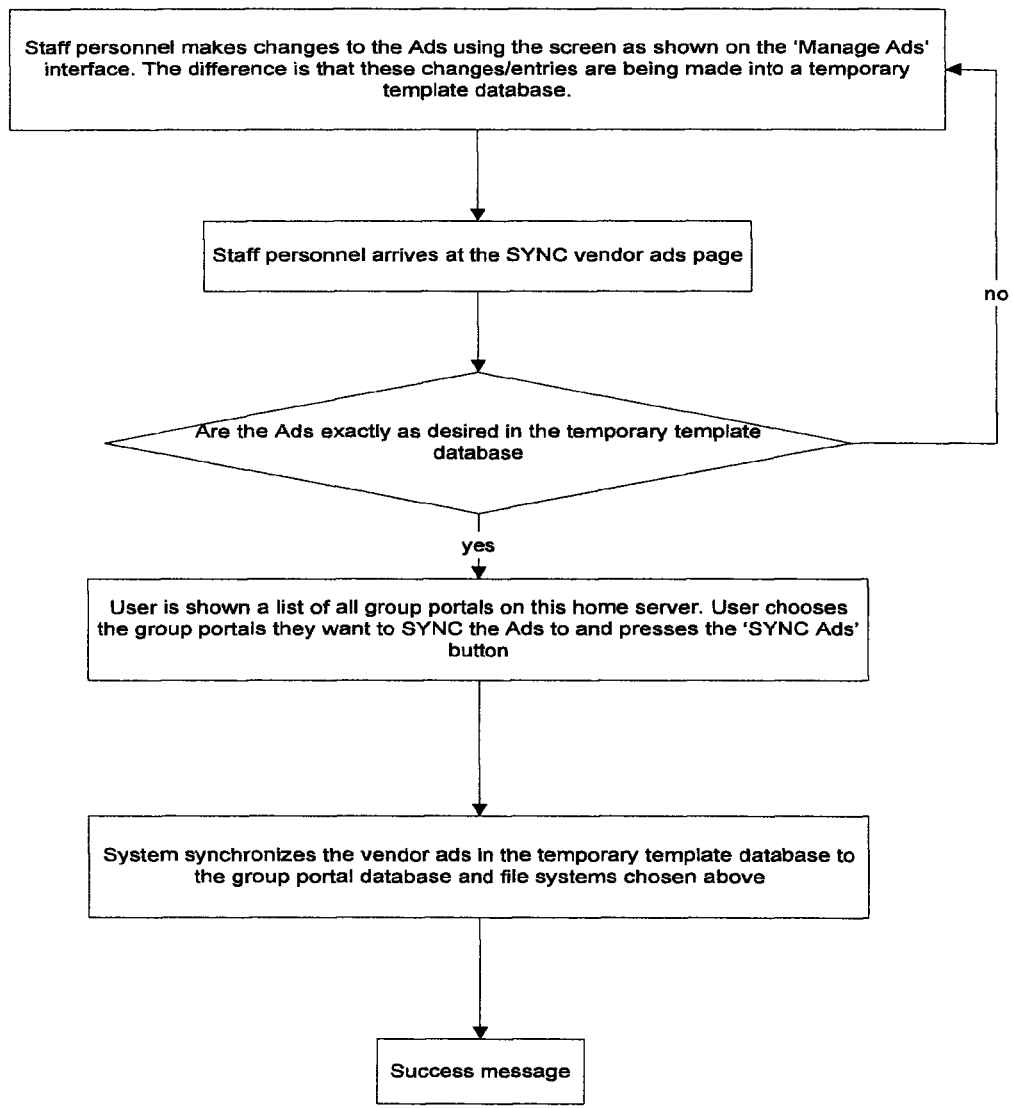
FIG. 26 is a schematic showing how administrative users can determine which group portals will be shown vendor advertisements.

FIG. 26 shows the staff control panel interface to synchronize vendors advertisements which are basically pictures presented in a slideshow form. The slides, when clicked, link to the specified vendor's website. Slides change over to the next one after the specified time delay. Before a bulk update is made to numerous group portals together, the ads are first fine tuned as needed in the temporary template database and only then synchronized over to the group portals.

Personnel choose the group portals to which they want to add the events to and press the 'ADD Events' button. The system adds the vendor events with all the above details to the individual group portal databases and furnishes the success message to the user. Staff personnel can choose to completely overwrite the links on the target group portals or they can just "ADD" to whatever the group portals already have. This enables fine control over the links content seen by various group portals without need for extensive manual update overhead.

In one embodiment, the Staff control panel enables the staff personnel to gather lists of members from all group portals from a given home server in a given format organized by access levels and even organized by group portals, if needed. The members lists retrieved include email address and optional first name, last name and phone number. The method enables the staff personnel to retrieve a list of email address of all administrators in all group portals or a list of first name, last name and phone numbers of all officers in five out of seventy group portals on a home server. Such lists are useful in communicating with a selected group of people or sending out notifications for meetings to all officers. The staff control panel also allows access to the interface that shows the logs of system tracking the login failures for a given group portal.

This helps in identifying and troubleshooting problems relating to login with pin point accuracy.

When an administrator changes a user on the 'Manage Users' page over from a 'student member' to an 'alumni member', that user immediately has no access to the member information (calendar, discussion board, announcements, questions, email groups, files, etc.) anymore, but immediately does have access to all info for an 'alumni' user (calendar, discussion board, announcements, questions, email groups, files, etc.). When adding a calendar item, the user can have it automatically send an email or text message reminder to a specific group of users anywhere from 15 minutes before up to 3 days before.

Across the site, users are allowed to refine the information they are viewing by specifying which groups of users they want to view the information for. So they could see phone email list, finances, announcements, etc for only alumni and junior members. Naming the groups is allowed as the users need it to be and still retaining the properties and characteristics of the group. For instance, one group can call their administrators as 'Coaches' while another might call them 'Dance leads'. This flexibility enables unprecedented ease of use and quick adoption of the system for management of group dynamics.

In an embodiment, a questions' functionality can allow asking questions that are either free text or preset answers and then quickly informing relevant groups about this question via email/text message. Answers chosen by users are presented in a easy to absorb format summarized by choice of answers. The backend hosts multiple group portals on one server each with its own database repository. An embodiment of the subject GIN system allows updating advertisements, links, startup dialog boxes on each of these separate databases all at once thus saving on management overhead.

An embodiment of the system tracks login failures, identifying and troubleshooting problems relating to login with pin point accuracy. The backend administration allows collating contact information from various databases to secure lists (of emails or phone numbers) organized optionally by group membership to enable quick and easy communication with various group leaders. The GIN template presents information about announcements, events, polls/questions, recently posted files, birthdays, recently posted discussion topics, weather, calendar in an easy to use format.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

DESCRIPTION OF PREFERRED EMBODIMENTS OF THE INVENTION

Embodiments of the invention present a set of computer-implemented methods and systems for uniquely organizing, integrating and assembling the different information sharing and communication features into a user-friendly interface allowing access from a plurality of independent user computer workstations after user identification. The integrating features and user-friendly techniques are widely useable, and various desired implementations of software can attain the same basic methodology.

The users can identify themselves using the pair of mnemonic identification keys supplied to them. The user workstations do not need to install any special application, software, or any special support systems to be able to access the system. They only need to have widely and freely available browsers such as Internet explorer, netscape, safari, and firefox on their workstations, most of which are already bundled for free with commercially available personal workstation operating systems. This enables the members of the group to access their group portal from geographically separated, workstation running on different operating systems as long as they are connected to the world wide web infrastructure or similar wide access communication systems hereinafter referenced to by the term "internet" or "web". Since users do not have to install any software to access their group portals, they are not required to bother with installation of upgrades (or security updates or the like) to the software or what version they are running. The supporting architecture of the invention handles everything automatically, seamlessly and painlessly shields users from the intricacies of the details and versions of the invention allowing users to focus on the task at hand.

Presented in FIG. 1 is the conceptual client server network diagram. A careful observation of the diagram indicates that the invention is comprised of a multi server backbone architecture consisting of one Master Server, one Mail Host Cluster, one Backup Server and one or more Home Servers. The Master Server houses the Master Web Server, the File Server, the Local Outgoing Mail Server (or the SMTP Virtual Server) and the Master Database. The Home Server houses the Web Server (which essentially converts data from the GIN System into something that can go over the web to the user at their home computer, and vice versa), the Database for the group website (contains the actual group data, such as calendar items, announcements, phone/email lists, etc.), the File System for the group website (this holds the group's files, such as Excel Spreadsheets and Word documents that they want to share with each other and that are stored on the GIN System) and a Local Outgoing Mail Server (sends out emails to group members). Thus the Master Server just contains the summary information of the group website and information about which Home Server holds the group website Database and File System. For each group that wants to use the features offered by the GIN System, an interface is setup using the Group Portal Creation Interface shown in FIG. 6. This interface, hereinafter referred to as the "group portal", allows authenticated access to the compelling features offered by the GIN System over the web. The creation process makes entries in the Master Server Database and creates the Database and File System structure for this new group portal on one of the Home Servers. The Master Server is the server that receives all client requests first. It resolves the requests, looks up the Home Server for the given portal and then forwards the user to the appropriate Home Server. Think of the Master Server as a combination of road signs that would tell the direction, and Home Server being the place where the actual destination is. A typical Home Server with mid-range hardware configuration holds about 50-60 group portals. The Database stores all the data that changes from time to time. The Web Server parses the programming codes of the invention and serves the website to the user. File System stores the files uploaded by the group members using the Files Sharing functionality and File Server provides access these files over the web. This architecture enables ease of moving a group portal from one Home Server to another in the event of exceeding load or server failure thus ensuring minimum downtime for visitors. The segregated database design pays back with speed, low cost, implementation flexibility and maintainability.

In other words, when a user types in a web address, such as http://www.theginsystem.com/gainesvillefootball, that query goes over the internet to the Master Server. The Master Server knows which of the many Home Servers has this particular GIN System (in this case, the Gainesville Football Team GIN System) on it. Note that one server can hold only so many GIN Systems (each group has their own GIN System) . . . at some point a server runs out of hard drive space or it runs too slowly because it is bogged down with too many users logged in at the same time. Therefore, there must be more than one Home Server if there are many GIN Systems. The Master Server then directs that query to the particular Home Server that houses that particular GIN System. So, the Master Server's purpose is to direct traffic. Note that in the software world, the term 'server' does not denote a physical computer 'box.' You can have one 'box' that has 500 different servers on it if you want, each doing a different thing. As it relates to this invention, it should be noted that since directing traffic (the Master Server's role) this is a relatively small task, the Master Server can be housed on a computer 'box' (or 'hardware server') that is also serving as a Home Server. This means that one less computer 'box' is needed, because one 'box' can serve the purpose of the being the one and only Master Server and also contain GIN Systems for various groups (that is, act as a Home Server as well).

It is clear on the figure that each Home Server has essentially 4 items/functions. It has the Database (all of the information of all of the GIN Systems that are on that Home Server), the Web Server (which takes all incoming data and outgoing data and 'translates' it into and out of the format that web browsers use), the File Server/File System (where all the files of all of the groups are stored for sharing with other group members), and the SMTP Virtual Server (which aids in the process of emailing members).

Referring to FIG. 1, the Mail Host (which takes care of most of the incoming and outgoing emails) is connected to all of the databases. For example, if a user were to email to members@gainesvillefootball.theginsystem.com, it would go from the user to the internet to the Mail Host of the invention, then to the Master Server. The Master Server would direct it to the right Home Server. The Home Server would verify that the email came from a group member, and then send it back to the Mail Host to be sent out to all the group members on that email list. The Mail Host would then use List Retrieval Software to send the email to every applicable user. Also referring to the FIG. 1, everything is linked to the backup server.

FIG. 2 depicts the software architecture of the GIN System. The Master Web Server hosts the following interfaces:
1) The Admin interface provides the entry point to the staff control panel so that the staff personnel can see a list of home server and groups portals hosted on it and go to a given home server to manage the back ends of the various group portals on that home server.
2) The Master Creation Interface is used by the Group Portal Creation interface (FIG. 6) to create new group portals.
3) The Admin Server Selection Interface lists the portals hosted on various homes servers, allows users select their group's portal and forwards them to the correct home server. That is, if someone types in http://www.theginsystem.com instead of http://www.theginsystem.com/gainesvillefootball, they will be shown a list of all groups' GIN Systems and they can simply click on 'Gainesville Football' and the Master Server will direct their web browser over to the correct Home Server and then direct the web browser to the Gainesville Football GIN System.
4) The User interface enables the users to access the groups portals hosted on the Master Server itself, if any. That is, remember that one server 'box' can serve as both the Master Server traffic director and also as a Home Server.

Each home server hosts the following interface:
1) The admin interface allows the staff personnel to manage the back ends of the various group portals on that home server.
2) The home creation interface is called by the master creation interface from the master server to create the new group portal's databases and file system when the functionality shown in FIG. 6 is used.
3) The User interface enables the users to access the groups portals hosted on the home server In other words, there are 3 ways to access a particular GIN System:
1) User Interface: this is the obvious part where a user can get into his/her group's GIN System.
2) Admin Interface is where employees of the company who maintains the GIN Systems (NOT the group members) can log in and do certain things to a GIN, such as place advertisements into GIN and edit the Links section. This functionality is not available to group members, even if they are 'administrators' of their GIN.
3) Home Creation Interface: Whenever a new GIN System is created for a new group, it goes from the Master Creation Interface to the Home Server where the creator would like the GIN System created. On that Home Server, the GIN System is created, using the Home Creation Interface.

The backup server hosts the backup software that periodically backs up the databases and file systems on master server, mail hosts and home servers.

The mail host handles the mailing lists by handing over requests to the list retrieval software. The mail web server handles administrative mailing list requests made by the master web server when a new group portal is being created. The mail server on the master server and the home server only sends out mail while the one on mail host handles both incoming and outgoing mail.

Each group portal could have various members falling into separate access levels. Access levels are simply partitions into which members are put based on what entitlements they have in a given group. Leaders go into the 'Administrators' access level. Followers go into the 'Member' access level. Members who are a little more proactive and help administrators manage the group fall into 'Officers' access level. Thus, Officers have more entitlements in a group than members and administrators have more entitlements than officers. The invention allows specification of as many access levels as necessary as shown in FIG. 2A. For example a group portal could have the following access levels:
1) Administrators
2) Senior members or officers
3) Full or current members
4) Alumni
5) Junior members
as shown in the first subsection in 2A labeled 'Three Story Group Access level Structure'. Each level can have certain privileges.

Another group could want a different access level structure and more number of levels, say, an extra level called 'Super Administrators' as shown in second subsection labeled 'Four Story Group Access level Structure'. Additionally, there could be two separate groups of administrators, officers and members whole reporting as a cluster to the super administrator. These separate group clusters have access to different sets of data and functionality all configurable through the group portal creation interface. Yet another group could have just two levels as shown in the third subsection 'Two Story Access Levels structure with labels customized for a Sports Team'. The group that wants to use the features offered by the invention can choose to call these access levels what they need it to be, while still retaining the properties and characteristics of the group. For example, one group can call their administrators 'Coaches' while another might call them 'Team Leaders'. As shown in the third subsection, one group chose to call the two access levels as 'Coaches' and 'Players'. This flexibility enables unprecedented ease of use and quick adoption of the system for management of group dynamics. It enables the group members to identify with the access levels because the access levels are created to suit the preexisting structure of the group's chain of command.

There are three levels of access to GIN: administrators, officers, and members. Level one is a regular member access level. Within level one, there are three types of users: junior members, members, and alumni. When a level one user places his mouse over "my menu" he sees only the level one features which are: 1) Main Welcome Screen 2) Phone/Email list 3) Edit Profile 4) Change Password 5) Help 6) Comments/Suggestions 7) Give GIN to a friend 8) Terms of Use 9) Privacy Policy. Each user type has the same level of access, but is completely separate from one another. Junior members will see a completely different home page, calendar, announcements, discussion board, files, and questions, than an alumnus. It is like three GINs in one. While these seem like different levels of access, they really are not. This separation is important because alumni have a much different agenda for accessing GIN than actual members. Alumni don't want to see announcements and questions that the active members are seeing. They have their own stuff going on. Also the leadership of the group has an interest in disallowing what the members can view. They also are a part of different email lists. If a person is designated a junior member, he will automatically placed on the juniormembers@theginsystem.com email list for that group. The same is true for the other two user types in level one.

Level one is essentially 3 GINs in one. But those "three" GINs are managed by one administrator or officer. Level two users are officers. Officers are a part of the member user type (as seen in the diagram). Officers enjoy all the Level one features of GIN because they are the "member" user type, but they have a higher level of access. Officers will have the EXACT same GIN as a typical "member," but for a few added features. When an officer puts his mouse over "my menu" he sees five extra tabs that are hidden from any level one user. Those five tabs are 1) Manage Questions 2) Manage Announcements 3) Manage Files 4) Manage Emails and Texts 5) Manage Public Calendar. This hierarchy is important because level one users do not have access to the "breakable" things in GIN. By allowing only a select few to have higher access levels, mistakes like erasing a public calendar or important announcements are far less likely to occur.

Level three access is for the administrators. Very few people using a GIN will have this level of access. Again, the administrator has the same GIN that typical members and officers have; the administrator just has the highest access level. An administrator has two tabs in his "my menu section" that are hidden from officers. These tabs are 1) Manage Users and 2) Site Settings. The administrator has full access to the GIN. He is able to designate what level of access users have. He also designates what user type each individual is (jr. member, member, alumnus). This is done with a drop down bar within the "manage users" tab. When the administrator designates a person as a specific level one user type, that person is automatically placed on the email list for that user type, and will see only what is available to that user type. For example, if an administrator designates Johnny as "member." Johnny will only be on the email list for members, and he will see only what the members see. Also, once Johnny graduates and the administrator switches Johnny to an "alumnus," Johnny will no longer have access to the members' information (calendar, announcements, etc.), but will have full access to the alumni information and will automatically be switched over to the alumni email lists.

The example above with three level one user types, one level two user type, and one level three user type is just the default for GIN. An infinite number of permutations of that model can be designed for each GIN. A basic example of this would be a group that doesn't want junior members. Their GIN can be customized to only have two level one user types. Also, each user type can be named whatever the group desires. For example, if a basketball team were using GIN, its level one user types could be called recruits, players, and alumni. Its level two user type could be called coaches. And its level three user type could retain the administrator title. Another possibility is that a much larger group would want to have more than three level one user types. That can be done. If they want to have numerous level two user types to manage specific level one users, that can be done. If they want to have multiple level three user types, each managing different sections of their GIN, that also can be done. Each level has an infinite number of permutations allowing the original 3-2-1 pyramid hierarchy to remain in place.

As for the email systems, ach level of access has their own email list i.e. Administrators@theginsystem.com, Officers@theginsystem.com, and members@theginsystem.com. The hierarchy is still in place. Administrators will receive emails from the members' email lists, but not the other way around. The Administrators' email list will only go to the administrators. Also, infinite numbers of email lists can be created for each level of access. The administrator can set up a social email list for the members or a New York alumni list for the alumni, but if he sets up an "officers social email list" for level two users, level one users will not have access.

These levels of hierarchy seem to indicate that administrators need to be more computer literate than general members. This is not necessarily true. The levels of access are in place so that general members cannot alter GIN as they please. An administrator does not need to be more computer savvy than a general member. Ease of use is one of the main appeals of GIN. For example, in order for an administrator to add a file, all she must do is click on her "manage files" tab. Once she has done that, she will need to put in a date (which is already provided for her or if she wants to change it she can click on the calendar right next to the date). Then she must click the browse button to add the file and add a description—by clicking in the text box. Finally she decides what level of users have access to the file—by clicking check boxes—and can decide to send an email or text message to all the users—by clicking another check box. All the "manage _____" tabs are this user friendly. They can be taught to an officer with little to no computer experience in very little time.

FIG. 3 is a flow chart showing the logic of a group member signing in to access their group portal. 'Y' and 'N' intuitively stand for yes and No respectively. U/P stands for Username/Password. When the user first types in http://www.<domain.ext>/(http://theginsystem.com) in their browser, they arrive at the landing page. On the landing page they can do the following four tasks:

1) Enter username and password and log into the system. If the username and password supplied by the user is correct, they are taken to the welcome screen depicted in FIG. 4. If this is the user's first login, they are required to read the terms of use and then agree to them, change their passwords from the default one to a more secure one, and fill out their profile.
2) They could choose to go to the 'forgot password screen'. (which emails them a new password)
3) They could click the link to be added as an email-only user and fill out their email address. Email-only users are the ones who receive only email communication from the group portal. Basically, their email addresses are added to an inbuilt email list called email-only@<groupname>.<domain.ext>. These are not full users of the GIN System. They do not have access. They are only putting their email address onto a special email list.
4) They could request to be added as a regular user. The administrators of the GIN System are then emailed to let them know that this event has happened, and when the administrators of the group portal log in, they see these new user addition requests and have the option to approve or deny them after looking at the information. If approved, the user is automatically emailed a username and password. If rejected, the user is automatically emailed to let them know they have been rejected.
5) They could choose to voluntary read the terms of use.

The Welcome screen or "dashboard" is conceptually-cum-physically depicted in FIG. 4. The welcome screen is the template layout that separates the screen into 4 distinct sections: top, left, right, bottom. The top section contains the customizable AD slideshow in which ads from vendors are presented as a click able set of pictures appearing one after another with a pre-defined, customizable time delay between them. These ads and time delay are not set by the group, but by the company which maintains the GIN Systems. The top section also contains the toolbar that leads to a navigation menu bar that allows access to the features offered by the GIN System. Menu bar is access level sensitive. It shows menu items available to different access levels in different colors, thus letting users with higher access levels quickly get a feel for what entitlements users with lower access levels have, thus helping their decision about what tasks they can delegate and making group administration easier. Not only are they color coded, they are also grouped by access level and labeled. The top section also shows the weather update and links to get Help on the system and Logout of the group portal.

The left section contains slideshow of pictures the attributes of that are completely customizable by the Administrators of the group portal. The administrators can change the pictures to anything they want like those from a recent party, meeting or events. The left section also contains a Google search box and a quick calendar view in month format showing the private and public events for the user in the current month.

The Center section boasts six boxes to uniquely present information to summarize communication updates since the last use.

The boxes summarize recent announcements, recent files, upcoming calendar events, questions that need to be answered by the user, upcoming birthdays and recent posts from the discussion boards. An external open source discussion boards program called PHPbb (available at http://phpbb.com) has been integrated to provide the discussion boards functionality. Note that this Welcome screen does not list ALL of the files, calendar items, birthdays, etc. It only lists events in the next 7 days, announcements posted in the last 7 days, birthdays in the next 7 days, files posted in the last 7 days, questions (polling) that have not yet been answered by the user, and discussion topics that have been active in the last 7 days. This keeps the user from being overloaded with all of the information in the GIN System. When the user first logs in, he/she only sees the most pertinent/current/pressing information.

FIG. 5 shows the logical layout of the home server administration interface. This interface is used to bulk-manage the backend of the group portals and perform routine administrations tasks quickly and efficiently. The user (not a group member in this case, but an employee of the company who owns and maintains all of the GIN Systems) first types in their browser http://<hostingdomain.ext/admin/>. This takes the user to the administration interface on the master server where they are shown a list of group portals and the n home servers they are hosted on. Some group portals may be clustered under a sub domain. If so, they are shown here. The user selects one of the group portals. This takes the user to the home server on which that group portal is. Now, the user is requested to enter the staff username and password to log on to that server. Once logged in, they are shown the staff control panel navigation menu that allows them to perform the various administrative functions shown in the figure.

FIG. 6 shows the Group Portal Creation Interface. This functionality is executed by the staff personnel whenever a new group portal is to be created. The interface first shows the users a list of home servers and requests the users to choose the server on which the new group portal should be created. Note that these servers may be different computer 'boxes.' That is, the staff person can decide which piece of hardware to create the new GIN System on. The personnel chooses the server based on what kind of sites already exists on that server and what type the new group portal is. The user is then requested to enter the name for the group portal and a non-spaced key name for the portal e.g. if a group name is Cedar Key Fisher, the access key name could be like 'cedarkeyfishers'. The user enters a few other details like the zip code and certain other customization specifications like if the group is composed of students who attend classes (and hence if the classes functionality should be hidden or not), IF the group does some kind of fee collection from its members to pay for it regular expenses (and hence if they would need the finances functionality), etc as shown in the figure. Finally, the personnel are requested to specify what the various access levels in the new portal should be named. As explained previously, one group who play hockey might want their administrators as 'Coaches' while another group whose main interests are in salsa dance might call their administrators as 'Dance leads'. They also choose what the email mailing lists used to communicate with various members in these access levels should be called. In the example above, the mailing lists could be called coaches@<groupkeyname>.<domain.ext> or danceleads@<groupkeyname>.<domain.ext>. After entering the above information, the personnel enter the secure password known only to staff and press the 'Create' button. This secure password prevents anyone else from creating new group portals. The system executes the various behind-the-scenes tasks shown in the figure and finally shows a success message to the user. The Group portal creation interface saves on labor. Using a common code base customizable through the interface, the needs of many different groups can be addressed. This lends unique adaptability and flexibility to the GIN system.

FIG. 7 shows the flowchart depicting the process followed to add a user to the group portal. Once the group portal has been created, the administrators of the group can log in using the initial username and password supplied to them and go on to add other members of the group on their own using this interface. When the administrator is using the Add Users interface, and they just have first name and last name information, they are probably typing it in by hand. Here typing a space is more convenient and intuitive. However, when they have first name, last name and email address, they probably have the list in spreadsheet format or comma-separated-values format generated from external listserv programs like yahoogroups, etc. When they have first name, last name, and email information, they are prompted to copy in using comma-separated-values. This enables quick list migration. The flowchart is pretty self-explanatory. When users are created with email addresses, they are each automatically emailed to let them know that they have been added to the GIN System and they are given their individualized username and password. Though not shown in FIG. 16, the manage user interface allows modifying current members. When an administrators changes a user on the 'Manage Users' page over from a 'student member' to an 'alumni member', that user immediately has no access to the member information (calendar, discussion board, announcements, questions, email groups, files, etc.) anymore, but immediately does have access to all info for an 'alumni' user (calendar, discussion board, announcements, questions, email groups, files, etc.).

FIG. 8 shows the logical inner working of List retrieval system (LRS) which is housed in the mail host. The LRS comes into action whenever anyone wants to send an email to members belonging to specific access levels in their group. Say for example they wanted to send an email to all rookies in the ice-hockey team. Then they would fire up their outlook or some web based email client and send an email to rookies@icehockey.<domain.ext>. Of course, the 'rookies' and 'icehockey' were chosen at the time of creation of their group portal. The email finds its way through the internet and reaches the mail host server shown in FIG. 1. The mail host immediately hands over the request to LRS which is basically a script running on an interpreted program. The LRS's get the entire email in some crude text format which contains all the details like sender email address, email address sent to, subject body, any attachments, etc. The LRS parses this email and figures out the group portal key name and then queries the master server and master database to find out the exact group portal this message was sent to and which home server that portal is located on. Bear in mind that the LRS receives tons of requests from different people belonging to different group portals, so it has to find out which group portal on which home server was this message meant for. LRS then queries the home server and database to find out firstly, if there is such an access level as rookie. If it is, the email addresses of all the members who are on that rookie list are retrieved. LRS then tries to find out if the sender (identified by the sender email address) is allowed to communicate with the rookie mailing list. If the sender is allowed, the email is sent out to the list of members that LRS got before. Otherwise, an error notification message is sent to the sender saying that he cannot send to the list.

Also note that any number of email lists can be created by the Officers of the GIN System. For example, users, in their profile, can check off if they want to be on any or all of the following email lists: 'weekly updates' 'monthly updates' 'those who reside in our residence' 'social email group'. Users can also decide the email address of each email group, when creating the email group. So, for example, users could email socialemailgroup@orlandofootball.theginsystem.com and that email would go out to all users who had checked off the check box in their Profile next to the name of that email group, thus signifying that they wanted to receive those emails.

FIG. 9 shows the File System structure on any given home server. The file system houses the programming code that drives the group portals and the various configurable files uploaded by staff personnel as well as group portal members. The structure consists of multi-level directory structures below the Home root. One set called the 'Code Base' is where all the programming code lives. This is the directory to which the servers access the interface e.g. http://www1.<domain.ext>/points. Nothing can be uploaded here. Only scripts are parsed by the server and web pages are served out to visitors.

The second set is called 'group portal root'. This is the directory to which media.<hostname.ext> points. This is the fileserver and the place where all the uploadable files reside in directories indexed by group key name. This separation of code from user content offers unique ease of maintainability, scalability and traffic analysis. The file server can be easily migrated to a different server, if needed. Uploadable files usually include files posted by users and those meant for vendor links and advertisements for that group portal.

The Logical Layout of Email and Text Messaging Administration Interface is presented in FIG. 10. As shown the user is allowed access to this functionality only if they have privileged entitlement defined in the access level they belong to. Aptly named, this interface allows send out email and text messages to various lists. FIG. 11 shows the Physical Layout of Email and Text Messaging Administration Interface. There are three types of lists:
1) Inbuilt lists,
2) User created lists (also called custom lists) and
3) email-only lists.
Inbuilt lists and user created lists are composed of members of the group's portal while email-only lists are composed of people who do not have any access to the group portal but just receive emails from the group portal.

The names for the inbuilt lists are specified at the time of the creation of the group portal as discussed earlier. So the administrators list contains all members who belong to the access level "administrators". Similarly, the rookie list (if so named) will contain all members who have access level "rookies (if so named otherwise 'junior members')".

User-created lists are those created by group portal administrators using the interface shown in FIG. 12, i.e. Create Custom email and text message lists.

Both emails and text messages can be sent to inbuilt lists and user-created lists.

Obviously, only emails can be sent to email-only lists since email address is the only detail available for these external users.

Text messages are sent out by using the cell phone/pager number and carrier information filled out in the profile.

Figure 13:
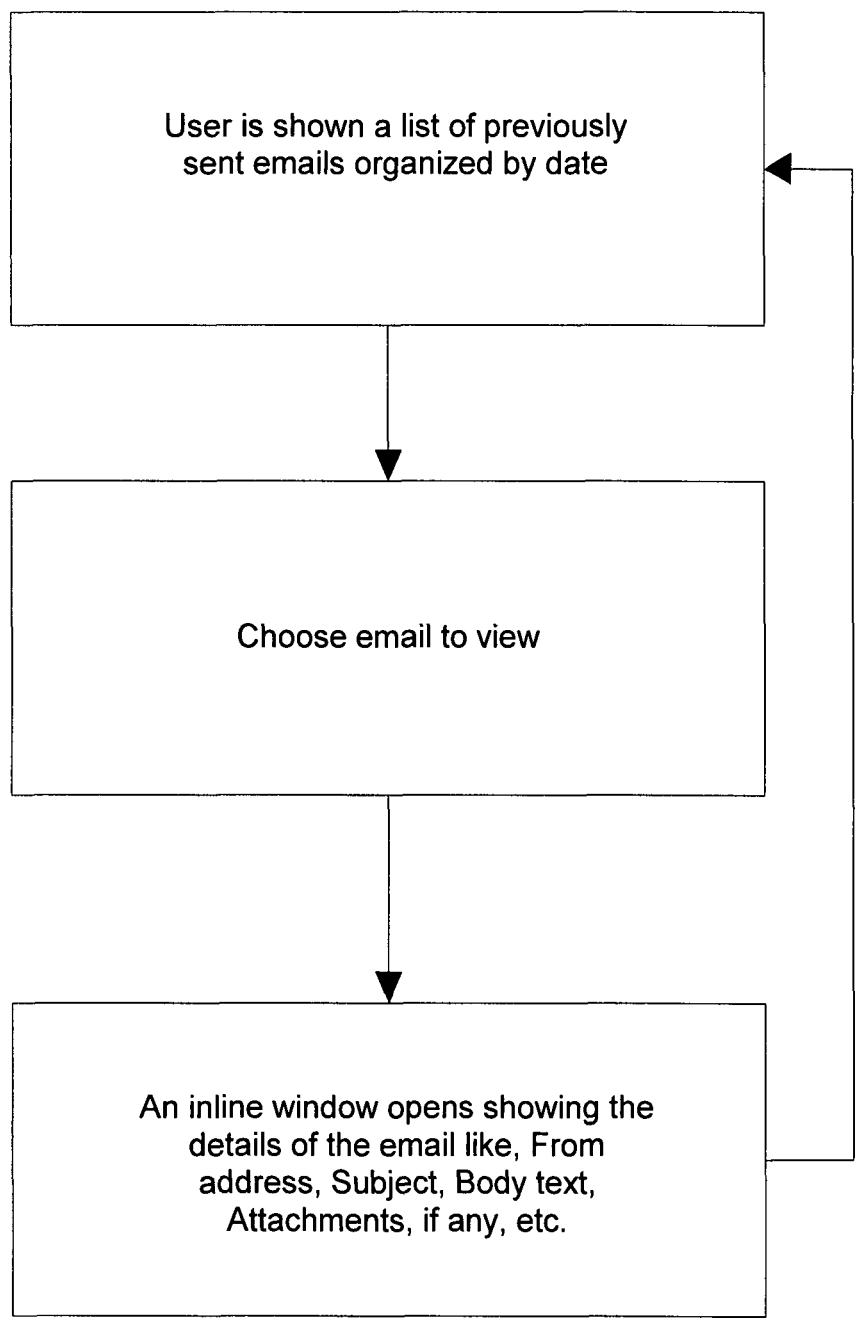
FIG. 13 is a schematic showing how a user can access previously sent emails, according to one embodiment of the subject invention.
Figure 14:
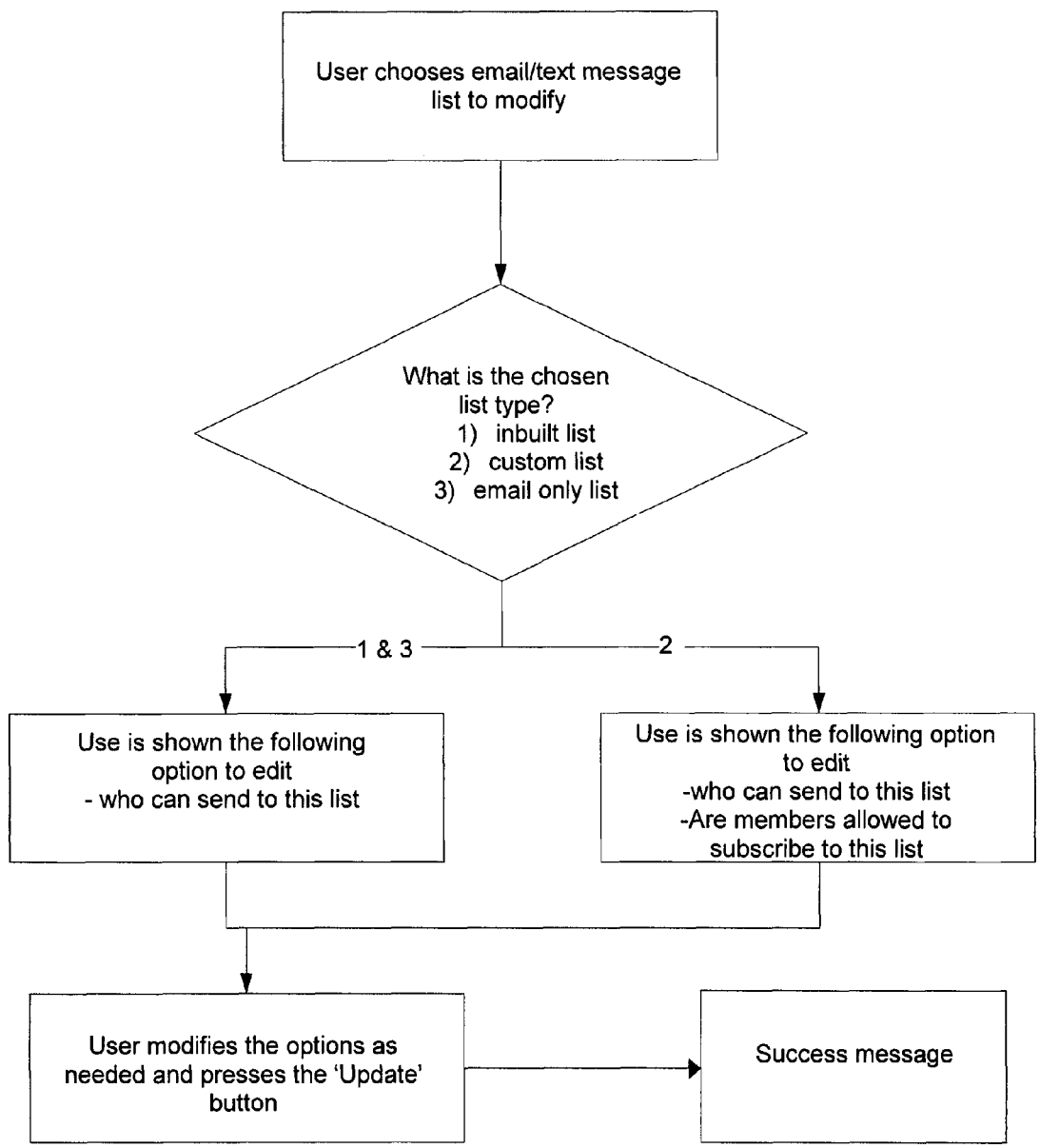
FIG. 14 is a schematic showing a process for modification of customized email lists, according to one embodiment of the subject invention.
Figure 15:
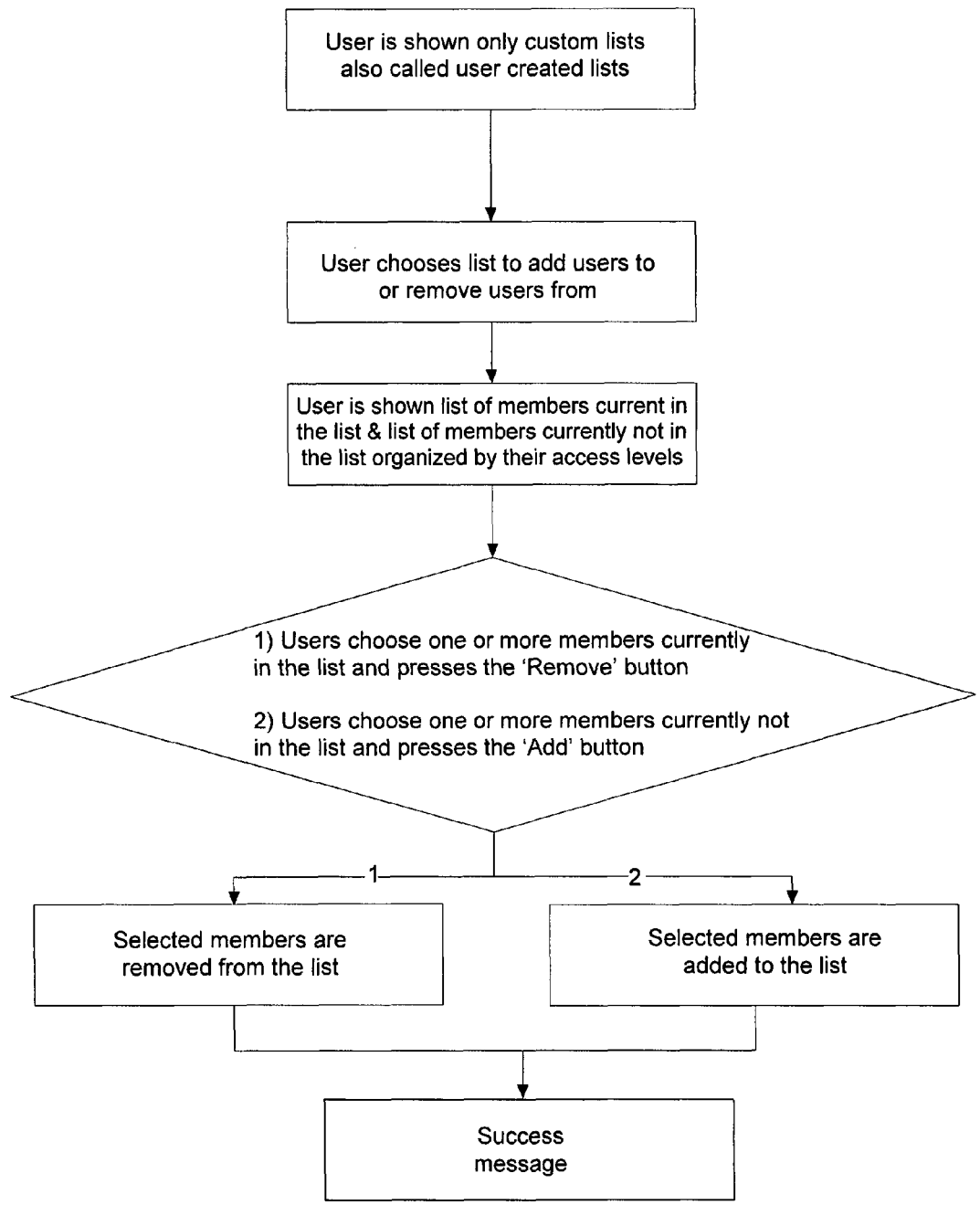
FIG. 15 is a schematic showing the process of adding/removing users from a list, according to one embodiment of the subject invention.

The email and text messaging interface is restricted to administrator/officer level access and allows the member to perform the following tasks:
1) Create a custom list detailed in FIG. 12
2) Delete a list as detailed in FIG. 10 and FIG. 11
3) See what communication has been made in the past with these lists detailed intuitively in FIG. 13
4) Modify the details of a list as shown in FIG. 14
5) Add/Remove users from a list as shown in FIG. 15.
6) Communicate with the lists as detailed in FIG. 10 in flow 6.

In FIG. 11, the various lists are listed along with the direct email address that can be used to email these lists using external email clients. Also, listed against each list are intuitive icons on the left that allow sending email to the list, sending text message to the list, adding/removing members from the list, modify list details and to delete the list. Clicking any of these icons opens an inline window that shows the appropriate functionality as detailed in figs listed above. For text-messaging, the group portal interface has to be used and cannot be done using external clients.

Apart from using the list, the buttons labeled "Send email to all group members" and "Send Text Message to all group members" can be used to communicate with all the members. Basically, clicking these buttons opens inline windows which list all the members in the group portal. The user can then choose which member they want to send out the email/text message to.

In FIG. 12, the physical layout of the Create Custom Lists Screen has been shown. The user is requested to enter the list name, which access levels are allowed to subscribe to this list, the direct email address they would want for this list, if members are allowed to subscribe to this list and what levels of users can send email to this list. Once this list is created, all members belonging to the access levels (who are allowed to subscribe), when they log into the group portal and go to their profile update screen shown in FIG. 25 are shown these email lists as available from them to subscribe. The administrators may also choose to add members manually to user-created lists by using the Interface shown in FIG. 15. They can also choose to make the email lists 'private' whereby users must be added to the email list . . . they cannot simply check off a box in their Profile and add themselves to a list. This is used when a group wants an email list that is only for certain people and does not want others to see these emails. Email addresses can also be added to Email-only lists using the intuitive interface shown in FIG. 15.

Email lists and text messaging interface uniquely allows selecting who to send the email or text message to, from the list, which not allowed by other listserv programs. If you remove a user from the group portal they are automatically removed from all lists (both email and text messaging).

FIG. 16 presents the Staff Interface to individual group portals. As shown, employees of the company have inherent, restricted, inbuilt access to back ends of all group portals so that they can perform maintenance tasks like updating ads in the backend, updating links, or putting ad events on group public calendar. The last process box on the flowchart in FIG. 16 details the various actions allowed on the vendor links update interface shown in FIG. 17. Note that these staff people do not have to be trained in web programming and also note that they have no access to any group's data (calendar, announcements, files, etc.). They are very limited in what they can see and do. This safeguards the privacy of the group.

As depicted in FIG. 17, links are essentially multilevel hierarchical mouse-over advertisements menus. The first level is called Vendor Categories level. The subsequent levels represent single level or multilevel advertisements. Each advertisement is represented by a vendor supplied image and when clicked takes the user to the specified vendor's website. Ads in one group's system can be added at a time or across all systems, or anywhere in between, eliminating the need for a highly trained web programmer or designer each time an ad is changed or added. This also eliminates having to go into each GIN individually to add a new link/advertisement. Also, there is a special access login for company employees to change ads on the backend (through the staff control panel), without having to have access to the system (and therefore, all of the private information) of the group. This increases the security of the system for the group.

Each Link has attributes like image that shows up for that link, the address of that link, if this link is a top level link or has parent links and if this link has more link beneath it in its hierarchy. The scheme shown in FIG. 17 allows capturing these details as well as the parent child relationships of links using a set of two codes one called identifier and other called the parent identifier.

The bottom part of FIG. 17 shows the details that need to be entered before a link can be created.

FIG. 18 show the physical interface used to manage slide show ads. Ads are basically vendor advertisements presented in a slideshow form. The slides, when clicked, link to the specified vendor's website. Slides change over to the next one after the specified time delay.

FIG. 19 shows the Manage Calendar events screen. The Calendar shows events in different views with custom colors and access levels. It operates in private and public mode. Calendar has month view where events are listed by dates. Clicking on a particular date brings the user to the day view for the date in which events are listed by time along with their description. Description may hold details of the event and venue or other related information. Each calendar event is click able with the link pointing to a customizable web address. Events are added to the calendar through the 'Manage calendar events' screen. Events can be recurring or one time. Recurring events are those that occur everyday, or every given day for every week in a month, or every nth days of a month or year. Events posted can be private or public depending upon the context in which the calendar is being viewed. Private events are posted by a user and are only seen by that particular user. In contrast, public events are posted by administrators and are visible to all members who belong to the access level group for which the event has been posted. A hockey game is an example of a public event. A Friday night date is an example of a private event. Meeting of coaches before hockey game is an example of a public event of all members who have the access level of coaches. Events can also be added/moderated through the staff control panel. Events added in such a way usually include vendor advertising events. An example would be opening night of a new bar in town. While posting public events, user can choose to remind the members associated n days, n hours and n minutes before the event via email and/or text message automatically. Users can also choose to notify the members immediately of the event and description.

Based on information entered by users in their profile and based on their option, users are also shown recurring events from local vendors offering local service of value to the members in the group portal. An example of such a service is tutoring schedule from local vendors/partners who offer coaching for classes which the user has mentioned they are attending at the school they go to (they filled this information into their Profile). This enables a highly targeted win-win matchmaking style advertising which brings immense value to members. Such events are shown in a different color to distinguish them from other events. This is primarily accomplished by pulling the schedule date in a predefined format from vendor's tutoring website and merging it into the members' calendar. An important point to remember is that these events are only shown if the member chooses to view such events thus offering great flexibility to the member while offering a great advertising venue for vendors' partners.

FIG. 20 shows the interface for posting Startup messages on any given group portal. Start-up Messages dialog boxes provide an easy way to communicate one-way with members in a given portal belonging to a particular access level. Examples of such communications include notification of new features in the system, important changes to certain functionalities, maintenance events, or some particular tasks that all administrators need to perform or serving reminders once they sign into the system. This method enables the staff to put on such messages on numerous group portals . . . sometimes hundreds of them in a few minutes. Once the members have seen the start up message, they are not shown that same message again the next time they login. The message comes up in a dialog box that the user must click 'okay' on in order to continue in the group portal. This message can be set through the staff control panel, which means that any employee of our company can login and do this without having access to any group portal and without any training whatsoever.

Questions enable polling the group on a particular topic or simply to get what sizes of t-shirts (M, L, XL, etc) each member would need. The Administration interface for Adding Questions has been shown in FIG. 21, for maintaining questions in FIG. 22 and the members interface to answers current questions has been intuitively depicted in FIG. 23

The questions functionality allows asking questions which are either free text or preset answers and then quickly informing relevant groups about this question via email/text message. Answers chosen by users are presented in an easy to absorb format summarized by choice of answers. This innovative feature is unlike other polling/voting features out there and makes activities like leader election, opinion count, etc. a breeze.

FIG. 24 shows the Site Settings screen. This screen allows members with administrative access to change the welcome message that appears on the login screen or landing page. The user simply uses a WYSIWYG (What You See IS What You Get) text editor to prepare a colorful formatted message and thus customize the landing page to suit their tastes. The long 'force users to change passwords' button allows the administrator to run a quick script that will essentially force every user to change their password the next time they login. A Feature like this helps remind the entire group about the need to change passwords regularly and force it gracefully.

The administrator can mention the name of one appointed individual in their group on this page to which everyone can go if they had questions about particular issues relating to use of various group networking tools.

Groups who are sensitive about their information can specify the desired amount of inactivity time after which the member will be logged out of the system. This prevents intruders from gaining access to the system by accident.

The last two sets of functionalities on this page allow the administrator to customize the slide show pictures on the welcome screen shown in FIG. 4 and the static pictures on the landing page. These customization features enable the group to personalize their group portal to their tastes and spirit.

FIG. 25 intuitively shows the logical process followed by a user in updating their profile.

FIG. 26 shows the staff control panel interface to synchronize vendors advertisements which are basically pictures presented in a slideshow form. The slides, when clicked, link to the specified vendor's website. Slides change over to the next one after the specified time delay. Before a bulk update is made to numerous group portals together, the ads are first fine tuned as needed in the temporary template database and only then synchronized over to the group portals.

The staff control panel of the invention allows the staff personnel to post exclusive vendor ad events on a plurality of group portals on a home server together. The staff personnel is first shown a screen similar to 'Manage Calendar Events' shown in FIG. 19 along with various details applicable to public mode. The fields for notifying members about the posting of this event as well as those allowing reminders for this event are not shown. The personnel is requested to enter details like title, description, whether the event is one time or recurring, the start and end time, event schedule, event date, event color and access levels for whom this event is being posted. The personnel is then shown a list of all group portals on this home server. Personnel choose the group portals to which they want to add the events to and press the 'ADD Events' button. The system adds the vendor events with all the above details to the individual group portal databases and furnishes the success message to the user.

Another thing that the staff control panel of the invention allows the staff personnel to do is update the vendor links in a given group portal or a plurality of group portals on a given home server together. The user first updates the links in the temporary location (called the 'temporary template database and file system') as desired. This usually involves adding new vendor categories and sub-level links or removing existing ones. The process is similar to the synchronization of vendor Advertisements. Another difference is that the staff personnel can choose to completely overwrite the links on the target group portals or they can just "ADD" to whatever the group portals already have. This enables fine control over the links content seen by various group portals without need for extensive manual update overhead.

The Staff control panel enables the staff personnel to gather lists of members from all group portals from a given home server in a given format organized by access levels and even organized by group portals, if needed. The members lists retrieved include email address and optional first name, last name and phone number. The method enables the staff personnel to retrieve say a list of email address of all administrators in all group portals or say a list of first name, last name and phone numbers of all officers in five out of seventy group portals on a home server. Such lists are useful in communicating with a selected group of people or sending out notifications for meetings to all officers.

The staff control panel also allows access to the interface that shows the logs of system tracking the login failures for a given group portal. This helps in identifying and troubleshooting problems relating to login with pin point accuracy.

The staff control panel also allows collating contact information from various databases to secure lists (of emails or phone numbers) organized optionally by group membership to enable quick and easy communication with various group leaders. Another feature of the email system and user system is that whenever a user is added, they are automatically set up two forwarding email accounts.

One is of the form:

[firstname][lastname][groupshortname].email.theginsystem.com

The second is of the form:

[GIN username]@[groupshortname].email.theginsystem.com.

In other words, when John Smith is added as a user in GIN, he is not only automatically created a username of jsmith and a default password, and not only immediately emailed with his username and password for accessing GIN, but two forwarding accounts are set up for him. This means that another group member could send an email from their personal email client to johnsmith@gainesvillefootball.email.theginsystem.com or jsmith@gainesvillefootall.email.theginsystem.com. This email goes to GIN and is then forwarded from the GIN System to whatever email address John Smith has entered as his personal email address in his Profile. Also note that if an Administrator of the Gainesville Football GIN System updates the username of John Smith, the GIN System automatically updates the forwarding email as well. Also note that the user can turn off this feature in their Profile if they so desire. The benefit of this email forwarding system is that group leaders do not have to save or remember the email addresses of each member. They simply need to know the first and last name of the group member or the first letter of the first name and the last name of the user and can email to GIN and GIN will route that email to the proper email address. Also, groups do not have to sign contracts with website hosting services that also give out email accounts. There is no longer a need to have company email accounts set up for each employee because they can use whatever email service they choose (Gmail, Hotmail, YahooMail, etc.) and it doesn't negatively affect the business because essentially, all group members always know all group members' email addresses because it's obvious (just their first and last name must be known).

Many features of the preferred embodiments have been discussed. Various embodiments of the invention can be customized by incorporating the features desired in a particular GIN system.

All patents, patent applications, and publications referred to or cited herein are incorporated by reference in their entirety, including all figures and tables, to the extent they are not inconsistent with the explicit teachings of this specification. It should be understood that the examples and embodiments described herein are for illustrative purposes only and that various modifications or changes in light thereof will be suggested to persons skilled in the art and are to be included within the spirit and purview of this application.

The invention claimed is:

1. A method for providing a system allowing a group of members to control the access of members to electronic information, comprising:

creating a member group electronic information set;
creating an officer group electronic information set;
creating an administrator group electronic information set;
creating a member group of members, wherein each member can access the member group electronic information set;
creating an officer group of officers, wherein each officer is a member, wherein officers can access the member group electronic information set, wherein officers can access the officer group electronic information set, and wherein members that are not officers cannot access the officer group electronic information set; and
creating an administrator group of administrators, wherein each administrator is an officer;
wherein administrators can access the member group electronic information set, wherein administrators can access the officer group electronic information set, wherein administrators can access the administrator group electronic information set, wherein members that are not administrators cannot access the administrator group electronic information set, wherein officers that are not administrators cannot access the administrator group electronic information set;
wherein administrators can add and remove officers to and from the officer group, wherein when administrators add an added officer to the officer group, the added officer automatically can access the officer group electronic information set, wherein when administrators remove a removed officer from the officer group, the removed officer automatically cannot access the officer group electronic information set; and
wherein officers can add and remove members to and from the member group, wherein when officers add an added member to the member group, the added member automatically can access the member group electronic information set, wherein when officers remove a removed member from the member group, the removed member automatically cannot access the member group electronic information set.

2. The method according to claim 1, further comprising:

creating a first member subgroup of first member subgroup members, wherein each first member subgroup member is a member,
creating a first member subgroup electronic information set, wherein administrators have access to the first member subgroup electronic information set, wherein officers have access to the first member subgroup electronic information set, wherein first member subgroup members have access to the first member subgroup electronic information set, wherein members that are not first member subgroup members, not officers, and not administrators cannot access the first member subgroup electronic information set.

3. The method according to claim 2, further comprising:

creating a second member subgroup of second member subgroup members, wherein each second member subgroup member is a member,
creating a second member subgroup electronic information set, wherein administrators have access to the second subgroup electronic information set, wherein officers have access to the second member subgroup electronic information set, wherein second member subgroup members have access to the second member subgroup electronic information set, wherein members that are not second member subgroup members, not officers, and not administrators cannot access the second member subgroup electronic information set, wherein each member can be in only one member subgroup.

4. The method according to claim 1, wherein the member group electronic information set comprises one or more of the following:

an electronic calendar, electronic announcements, an electronic discussion board, email groups, text messaging, and electronic chat groups.

5. The method according to claim 1, wherein officers can add and delete to and from the officer group electronic information set.

6. The method according to claim 1, further comprising:
creating a second member group electronic information set;
creating a second officer group electronic information set;
creating a second administrator group electronic information set;
creating a second member group of second members, wherein each second member can access the second member group electronic information set; and
creating a second officer group of second officers, wherein each second officer is a second member, wherein second officers can access the second member group electronic information set, wherein second members that are not second officers cannot access the second officer group electronic information set, and wherein second officers can access the second officer group electronic information set,
creating a second administrator group of second administrators, wherein second administrators can access the second member group electronic information set, wherein second administrators can access the second officer group electronic information set, wherein second administrators can access the second administrator group electronic information set, wherein second members that are not second administrators cannot access the second administrator group electronic information set, wherein second officers that are not second administrators cannot access the second administrator group electronic information set,
creating a super administrator group of super administrators, wherein the super administrators have access to the administrators group electronic information set, wherein the super administrators have access to the second administrator group electronic information set.

7. The method according to claim 6, wherein the super administrators have access to the officer group electronic information set, wherein the super administrators have access to the second officer group electronic information set.

8. The method according to claim 6, wherein the super administrators have access to the member group electronic information set, wherein the super administrators have access to the second member group electronic information set.

9. The method according to claim 1, wherein access to the member group electronic information set is provided via the internet.

10. A method for providing a system allowing emailing within a group of members, comprising:
creating a member list of members, wherein the member list has a member list email address;
creating an officer list of officers, wherein each officer is a member, wherein the officer list has an officer list email address;
creating an administrator list of administrators, wherein each administrator is an officer, wherein the administrator list has an administrator list email address;
wherein each member has an email address,
wherein an email sent to the member list email address is sent to the email address of each member on the member list, wherein an email sent to the officer list email address is sent to the email address of each officer on the officer list, wherein an email sent to the administrator list email address is sent to the email address of each administrator on the administrator list,
wherein administrators can add and remove officers to and from the officer list, wherein when administrators add an added officer to the officer list, the added officer automatically receives an email sent to the officer list email address, wherein when administrators remove a removed officer from the officer list, the removed officer automatically does not receive an email sent to the officer list email address; and
wherein officers can add and remove members to and from the member list, wherein when officers add an added member to the member group, the added member automatically receives an email sent to the member list email address, wherein when officers remove a removed member from the member list, the removed member automatically does not receive an email sent to the member list email address.

11. The method according to claim 10, wherein each member can change the member's email address.

12. The method according to claim 10, further comprising:
creating at least one additional list of members, wherein each of the at least one additional list has a corresponding at least one additional list email address, wherein an email sent to one of the at least one additional list email address is sent to the e-mail address of each member on the one of the at least one additional list of members.

13. The method according to claim 10, wherein administrators have the ability to change a member's e-mail address.

14. The method according to claim 10, wherein members can email the member list email address.

15. The method according to claim 14, wherein members can email the officer list email address.

16. The method according to claim 1, wherein the officer group of officers has n officers, where n is greater than one.

17. The method according to claim 16, wherein the administrators group of administrators has m administrators, where m is greater than one.

18. The method according to claim 6, further comprising:
creating a super administrator group information set, wherein only super administrators have access to the super administrator group information set.

19. The method according to claim 6, wherein members, officers, and administrators cannot access the second member group electronic information set, the second officer group electronic information set, or the second administrator group electronic information set, wherein second members, second officers, and second administrators cannot access the member group electronic information set, the officer group electronic information set, or the administrator group electronic information set.

20. A non-transient media storage device having machine-readable instructions stored thereon for providing a system allowing a group of members to control the access of members to electronic information, comprising:
an input for receiving a member group electronic information set;
an officer group electronic information set;
an administrator group electronic information set;
a member group of members; an officer group of officers; and an administrator group of administrators, wherein each member can access the member group electronic information set, wherein officers can access the member group electronic information set, wherein officers can access the officer group electronic information set, and wherein members that are not officers cannot access the officer group electronic information set, wherein each administrator is an officer;
wherein administrators can access the member group electronic information set, wherein administrators can access the officer group electronic information set, wherein administrators can access the administrator group electronic information set, wherein members that are not administrators cannot access the administrator group electronic information set, wherein officers that are not administrators cannot access the administrator group electronic information set; and wherein administrators can add and remove officers to and from the officer group, wherein when administrators add an added officer to the officer group, the added officer automatically can access the officer group electronic information set, wherein when administrators remove a removed officer from the officer group, the removed officer automatically cannot access the officer group electronic information set; and wherein officers can add and remove members to and from the member group, wherein when officers add an added member to the member group, the added member automatically can access the member group electronic information set, wherein when officers remove a removed member from the member group, the removed member automatically cannot access the member group electronic information set.

21. A non-transient media storage device having machine-readable instructions stored thereon for providing a system allowing emailing within a group of members, comprising:

an input for receiving: a member list of members, wherein the member list has a member list email address;

an officer list of officers, wherein each officer is a member, wherein the officer list has an officer list email address;

an administrator list of administrators, wherein each administrator is an officer, wherein the administrator list has an administrator list email address; and an email address for each member, wherein an email sent to the member list email address is sent to the email address of each member on the member list, wherein an email sent to the officer list email address is sent to the email address of each officer on the officer list, wherein an email sent to the administrator list email address is sent to the email address of each administrator on the administrator list, wherein administrators can add and remove officers to and from the officer list, wherein when administrators add an added officer to the officer list, the added officer automatically receives an email sent to the officer list email address, wherein when administrators remove a removed officer from the officer list, the removed officer automatically does not receive an email sent to the officer list email address; and wherein officers can add and remove members to and from the member list, wherein when officers add an added member to the member group, the added member automatically receives an email sent to the member list email address, wherein when officers remove a removed member from the member list, the removed member automatically does not receive an email sent to the member list email address.

* * * * *